Nov. 30, 1965  F. D. LOW  3,220,228
CONTROL CIRCUITS FOR AUTOMATIC CLOTHES WASHING MACHINES
Filed Feb. 21, 1964  6 Sheets-Sheet 1

INVENTOR.
Frank D. Low
BY
Bradley, Baird, Clayton
Miller & Vogel,
ATTYS.

INVENTOR.
Frank D. Low

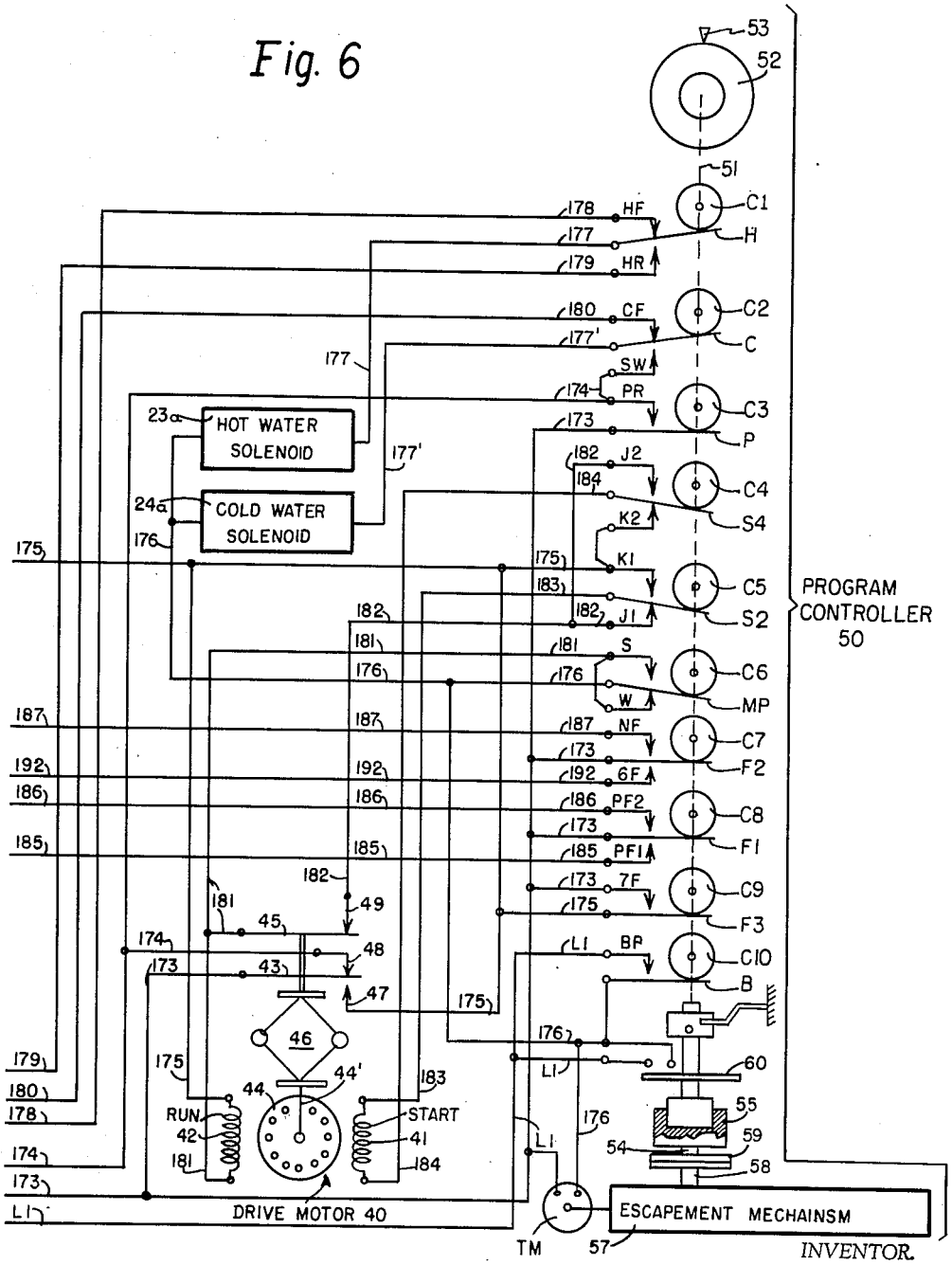

Nov. 30, 1965 F. D. LOW 3,220,228
CONTROL CIRCUITS FOR AUTOMATIC CLOTHES WASHING MACHINES
Filed Feb. 21, 1964  6 Sheets-Sheet 4

| CAM NUMBER | CENTER TERM. | CIRCUIT TERM. | FUNCTION | TIME IN MINUTES 41 1/4 — 3 3/4 FILL / AGITATE 15 (3 3/4 FILL / AGITATE 9 / 3 3/4 FILL / AG 3 / F / 4 1/4 SPIN / PAUSE / COAST) / RINSE (3 3/4 FILL / AG. 4 1/2 / 0 F / PAUSE) / 6 3/4 SPIN / COAST / OFF-RESET |
|---|---|---|---|---|
| | | | INTERVAL | 60 INTERVALS OF 6° EACH — 45 SECONDS / IMPULSE  5   15   25   35   45   55 |
| C1 | H | HF | HOT FILL | 1  6 9  14 17  22 |
| | | HR | HOT RINSE | 34  42 |
| C2 | C | CF | COLD FILL | 1  6 9  14 17  22 |
| | | SW | COLD RINSE | 23  30 34  42 |
| C3 | P | PR | POWER RINSE | 23  30  40 42 |
| C4 | S4 | J2 | SPIN DIRECTION | 27 32  46  56 |
| | | K2 | WASH DIRECTION | 34  44  60 |
| C5 | S5 | K1 | SPIN DIRECTION | 27 32  46  56 |
| | | J1 | WASH DIRECTION | 34  44  60 |
| C6 | MP | S | SPIN POWER | 27 32  46 54 |
| | | W | WASH POWER | 44 |
| C7 | F2 | NF | NORMAL FILL | 6  14  22  39 |
| | | 6F | EXTRA FILL #1 | 7  23  27 32  40 44 46  53 |
| C8 | F1 | PF2 | PART FILL #2 80% | 13  21  38 |
| | | PF1 | PART FILL #1 60% | 4  12  20  37 |
| C9 | F3 | 7F | EXTRA FILL #2 & MOTOR LATCH | 8  16  24 27  41  46 |
| C10 | B | BP | BY PASS | 60 |

Fig. 7

INVENTOR.
Frank D. Low
BY
Prangley, Baird, Clayton,
Miller & Vogel,
ATTYS.

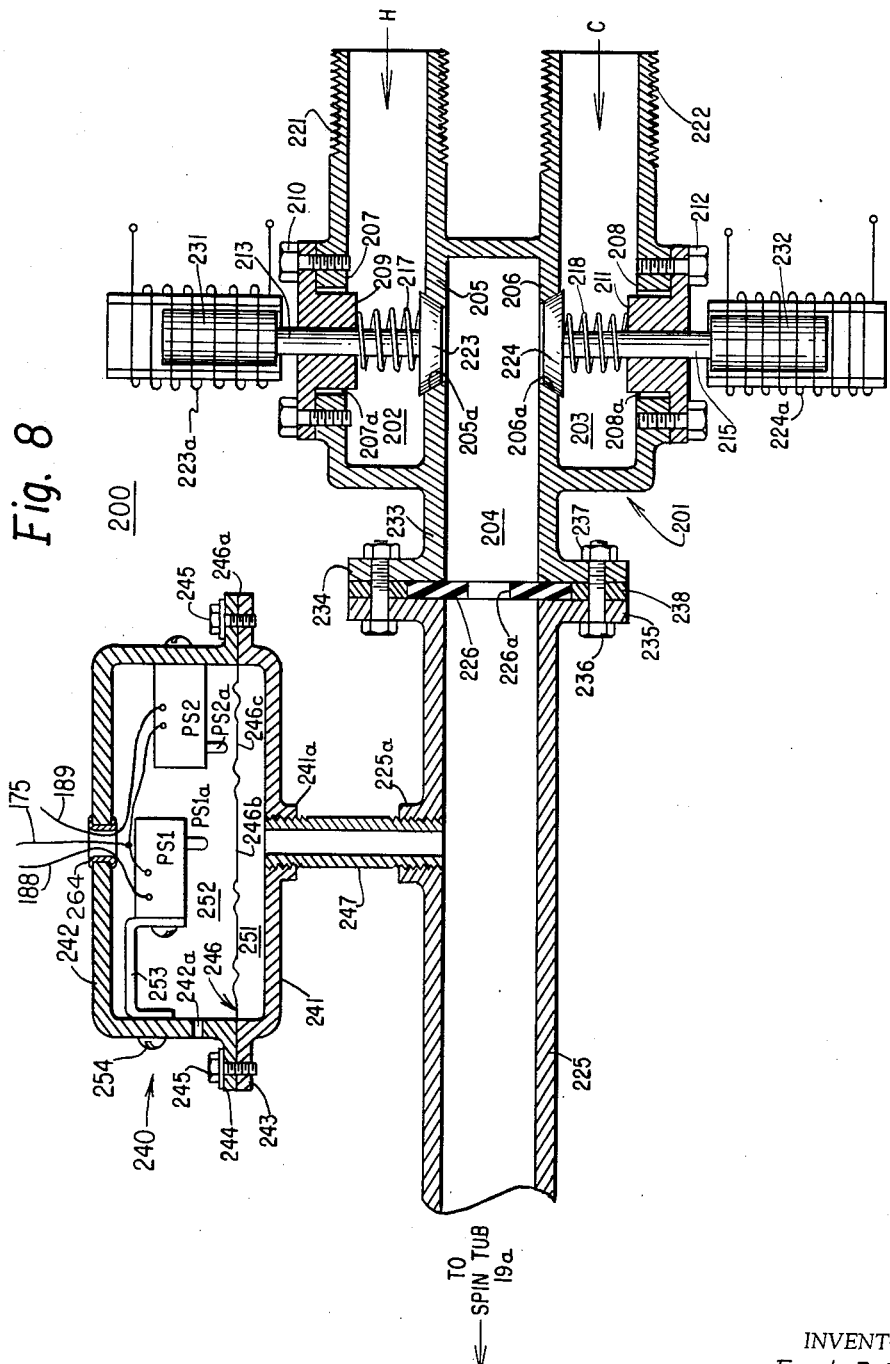

INVENTOR.
FRANK D. LOW

United States Patent Office

3,220,228
Patented Nov. 30, 1965

3,220,228
CONTROL CIRCUITS FOR AUTOMATIC CLOTHES
WASHING MACHINES
Frank D. Low, La Grange Park, Ill., assignor to General
Electric Company, a corporation of New York
Filed Feb. 21, 1964, Ser. No. 346,517
14 Claims. (Cl. 68—12)

The present invention relates to control circuits for automatic clothes washing machines, and more particularly to such control circuits incorporating pressure-compensated timed-fill facility for controlliny the volume of water that is introduced into the tube of the washing machine for use in carrying out the washing and rinsing cycles in the automatic program of operation of the machine.

In the operation of an automatic clothes washing machine it is highly desirable to control the volume of water that is introduced into the tub thereof for use in the washing and rinsing cycles of the automatic program, since it is very advantageous to match such volumes and the load of clothes to be washed or processed in the machine. It is exceedingly difficult actually to measure the volume of water that has been introduced into the tub, particularly in a washing machine of the spin tub type, whereby a conventional machine of this type accomplishes this function indirectly by timing the fill step, the control circuit incorporating a manually operable fill controller that is selectively operated to preset predetermined fill time intervals during which the valve mechanism is open between the water supply system and the tub of the machine. In this arrangement, a pressure regulator is incorporated in a fill conduit extending from the valve mechanism and communicating with the tub, the pressure regulator being characterized by the production of an outlet pressure of about 5 pounds per square inch gauge, notwithstanding a variable inlet pressure in the general range 15 to 100 pounds per square inch gauge, whereby the conduit introduces water into the tub, when the valve mechanism is open, at a rate of approximately 3 gallons per minute.

This conventional arrangement is very economical and highly satisfactory in operation, provided the water pressure in the water supply system is at least about 15 pounds per square inch gauge, as noted above. However, such conventional pressure regulators of simple and economical construction and arrangement are not operative to produce the substantially fixed rate of flow, of water of about 3 gallons per minute, in the event the water pressure in the water supply system falls below about 15 pounds per square inch gauge; whereby the flow rate is then reduced and becomes generally proportional to the actual pressure of the water in the water supply system.

Thus, in the operation of the machine, the operator must guess the pressure of the water in the water supply system, and then manually preset the fill controller to a higher than desired setting in order to obtain approximately the desired volume in the filling steps of the program, so as to insure adequate and proper volumes of water in the tub in the washing and rinsing cycles of the program. Of course, this becomes quite impossible, since the water pressure in the water supply system may vary substantially after presetting of the fill controller and prior to the carrying out of the various fill steps in the automatic program of the machine.

Accordingly, it is a general object of the invention to provide in the control circuit of an automatic clothes washing machine, a manually operable fill controller that is selectively presettable in accordance with desired predetermined time intervals, a device that is selectively operated in accordance with the pressure of the water in the water supply system, apparatus that is selectively controlled jointly by the presetting of the fill controller and by the operation of the device for preselecting a fill time interval, and a program controller for selectively opening, in accordance with the preselected fill time interval, valve mechanism arranged between the water supply system and the tub of the washing machine, whereby the device compensates the fill controller in the joint control of the apparatus.

Another object of the invention is to provide in the control circuit combination of the character set forth, an arrangement wherein the device is operated into respective high and low positions in response to corresponding high and low pressures in the water supply system, wherein the apparatus is controlled by the high position of the device to preselect a fill time interval corresponding to the preset position of the fill controller, and wherein the apparatus is controled by the low position of the device to preselect a fill time interval that is a time increment longer than that corresponding to the preset position of the fill controller.

A further object of the invention is to provide in the control circuit combination of the character set forth, an arrangement wherein the device is operated into respective high and medium and low positions in response to corresponding high and medium and low pressures in the water supply system, wherein the apparatus is controlled by the high position of the device to preselect a fill time interval corresponding to the preset position of the fill controller, wherein the apparatus is controlled by the medium position of the device to preselect a fill time interval that is one time increment longer than that corresponding to the preset position of the fill controller, and wherein the apparatus is controlled by the low position of the device to preselect a fill time interval that is two time increments longer than that corresponding to the preset position of the fill controller.

Further features of the invention pertain to the particular arrangement of the elements of the electric control circuit for the automatic clothes washing machine, whereby the above-outlined and additional operating features thereof are attained.

The invention, both as to its organization and method of operation, together with further objects and advantages thereof, will best be understood by reference to the following specification, taken in connection with the accompanying drawings, in which.

Figure 1:
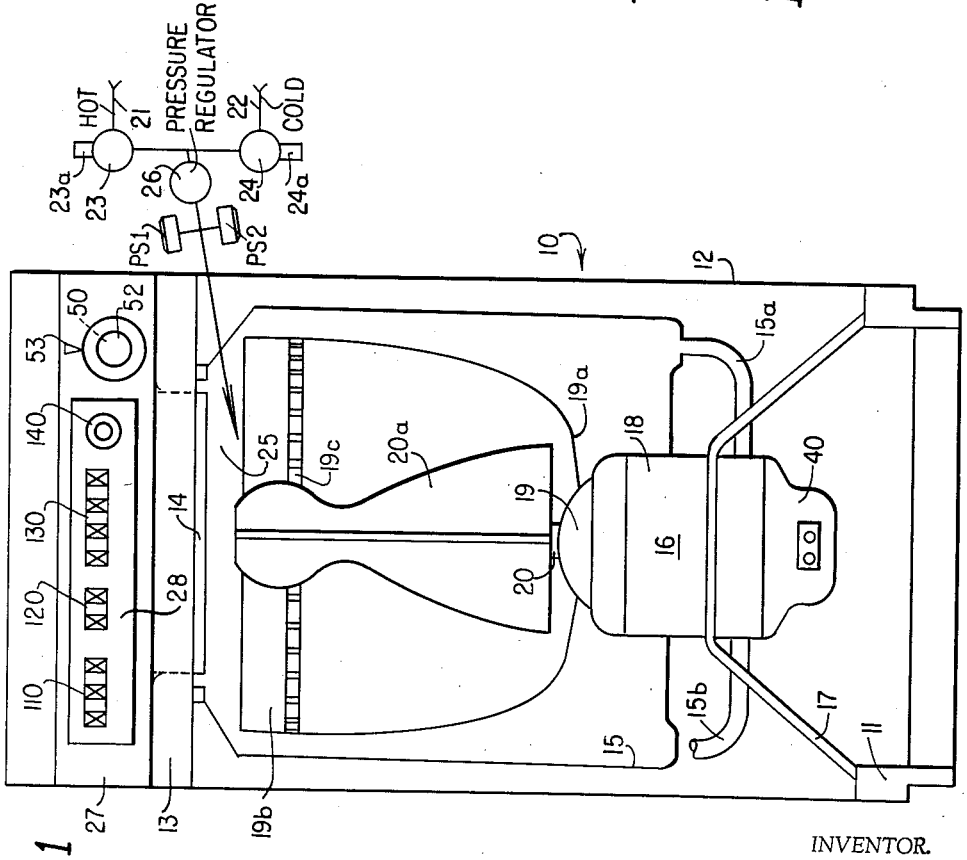
FIGURE 1 is a combined schematic illustration and skeleton front view of an automatic clothes washing machine incorporating an electric control circuit embodying the present invention.
Figure 5:
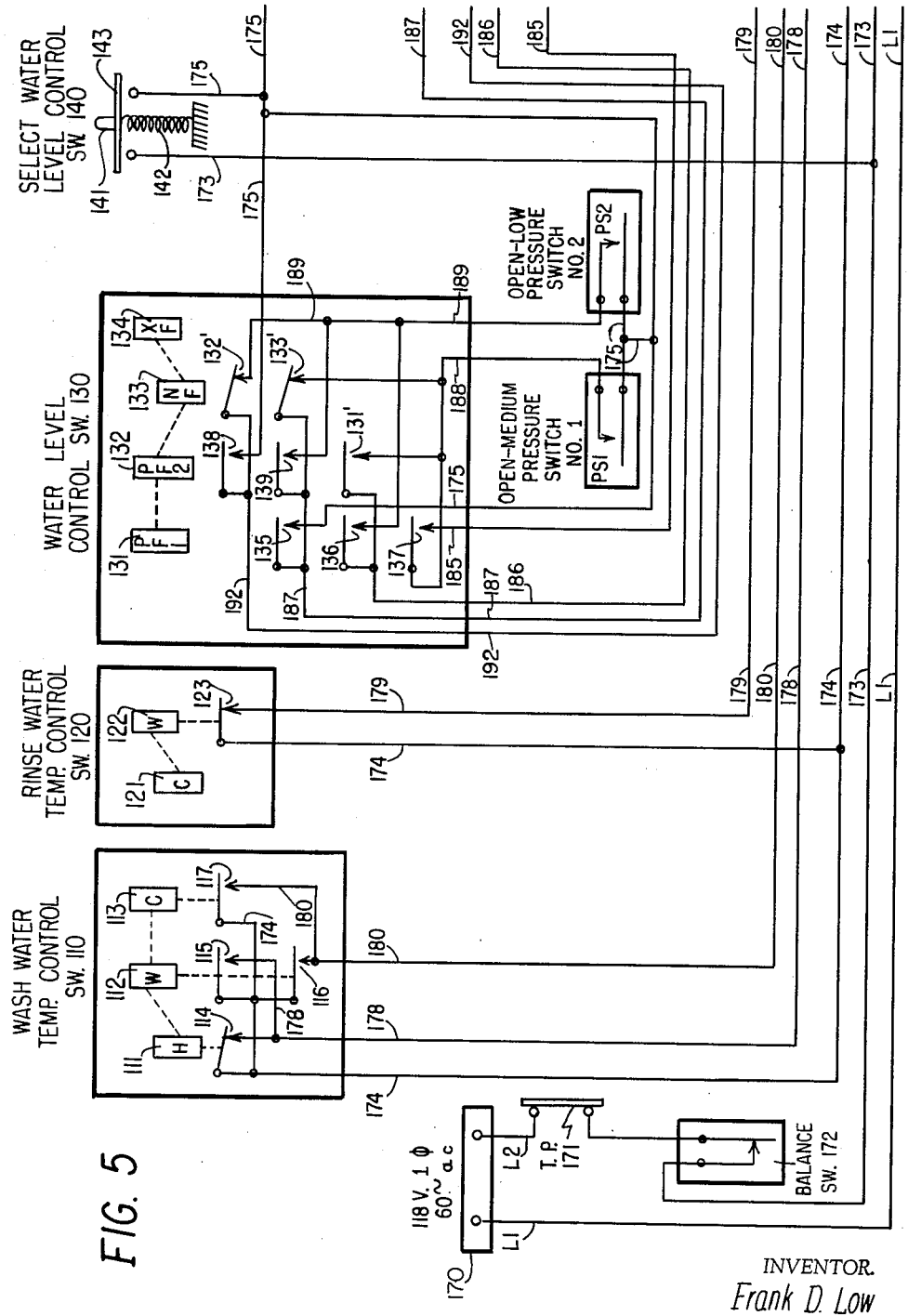
Figure 8A:
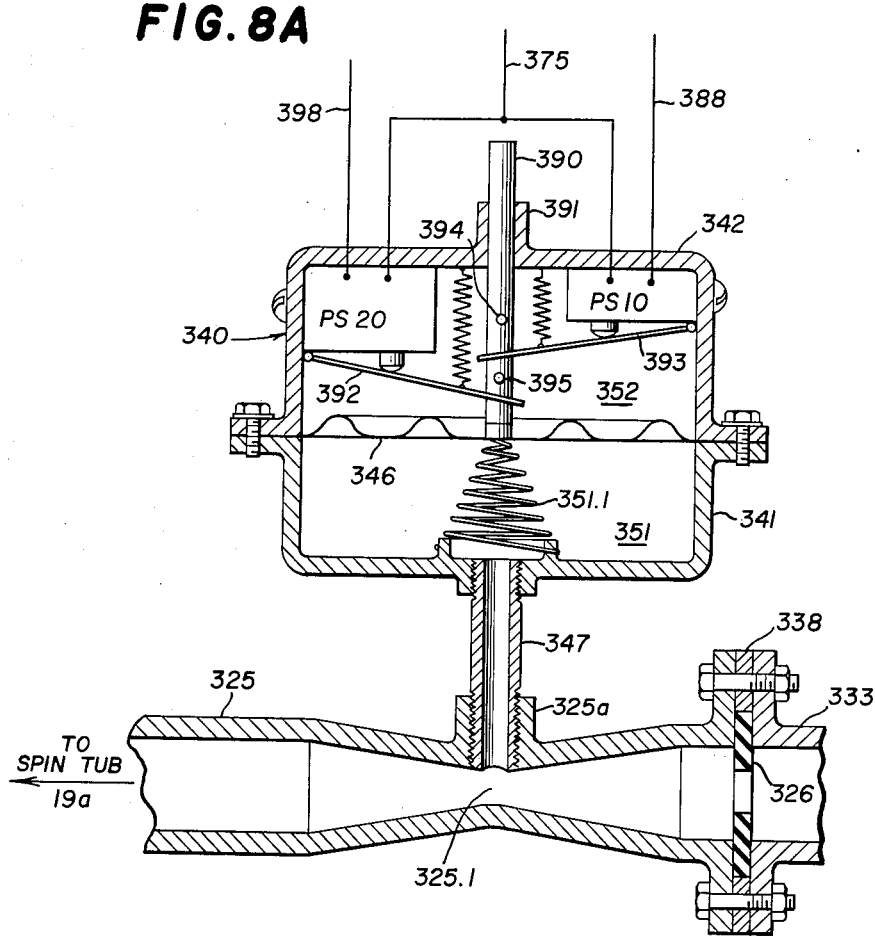

FIGS. 5 and 6, taken together, are a diagram of the electric control circuit embodying the present invention and incorporated in the machine shown in FIG. 1;

FIG. 7 is a time-sequence control chart of the control cams carried by the drive shaft of the program controller incorporated in the electric control circuit shown in FIG. 6;

FIG. 8 is a combination schematic diagram and vertical sectional view of a unitary water valve construction, water pressure regulator, and water-pressure responsive and switch-actuating device that may be incorporated in the machine of FIG. 1 and in the control circuit therefor, as shown in FIG. 5; and FIG. 8A illustrates a modification in FIG. 8, wherein the water-pressure responsive device is controlled by negative pressures rather than by positive pressures.

Referring now to FIG. 1 of the drawings, the clothes washing machine 10 there illustrated is of the spin-tub type and of the general construction and arrangement of that disclosed in U.S. Patent No. 2,639,618, granted on May 26, 1953, to Jacob W. McNairy. More particularly, the machine 10 comprises a substantially square supporting base 11 carrying wall structure defining an upstanding casing 12 including a substantially horizontally disposed top wall 13 having a top opening therein and provided with a cooperating top door 14 arranged for movements between open and closed positions with respect thereto. Housed within the casing 12 is an upstanding drain tub 15 that is suitably supported upon the base 11 and provided with an open top that is sealed against the underside of the top wall 13 in surrounding relation with respect to the top opening therein. A unitary mechanism 16 is arranged in upstanding position in the lower portion of the casing 12 and suitably supported upon the base 11 by structure indicated at 17. The mechanism 16 includes a casing 18 that is arranged in an opening provided in the bottom wall of the drain tub 15 and sealed in place, whereby the lower portion of the casing 18 is disposed below the bottom wall of the drain tub 15 and the upper portion of the casing 18 is disposed above the bottom wall of the drain tub 15. The casing 18 houses in the lower portion thereof an electric drive motor 40 of the reversible-rotor type that is also of the 4-pole, split-phase, induction type, as described more fully hereinafter; the rotor of which drive motor 40 is operatively connected to a water pump, not shown, that is also housed within the casing 18. In the arrangement, the pump mentioned is provided with an inlet to which there is connected an inlet conduit 15a communicating with the bottom of the drain tub 15, and also an outlet to which there is connected an outlet conduit 15b extending to drain plumbing, not shown. In the arrangement, rotation of the rotor of the drive motor 40, in at least the reverse direction thereof, operates the pump mentioned, so that any water in the drain tub 15 is pumped therefrom to the drain plumbing via the conduits 15a and 15b in an obvious manner.

Also, the unitary mechanism 16 comprises an outer rotatable element 19 arranged adjacent to the upper end of the casing 18 and disposed exteriorly thereof and positioned in the lower portion of the drain tub 15; which rotatable element 19 carries an upstanding spin tub 19a that is of conventional construction provided with a substantially annular wall that is upwardly and outwardly flared and having an open top disposed somewhat below the top opening provided in the top wall 13 and in alignment therewith, thereby to accommodate ready placement and removal of the clothes with respect to the spin tub 19a through the top opening mentioned, when the top door 14 occupies its open position. Further, the unitary mechanism 16 comprises an inner oscillatable element 20 projecting through the extreme upper end of the rotatable element 19 and carrying an upstanding agitator 20a aranged substantially centrally within the spin tub 19a. Moreover, the upper open end of the spin tub 19a carries the usual balance ring 19b through which suitable openings 19c are arranged in an annular array for the centrifugal discharge of the water therethrough from the spin tub 19a into the drain tub 15.

Finally, the unitary mechanism 16 comprises operative mechanism for selectively interconnecting the rotor of the electric drive motor 40 respectively to the agitator 20a and to the spin tub 19a. In the arrangement, when the rotor of the drive motor 40 is rotated in the forward direction, the agitator 20a is oscillated thereby, and when the rotor of the drive motor 40 is rotated in the reverse direction, the spin tub 19a is rotated thereby. Of course, oscillation of the agitator 20a effects a washing action upon the clothes suspended in the wash water contained in the spin tub 19a, while rotation of the spin tub 19a effects a water-extraction action upon the clothes contained in the spin tub 19a. Specifically, rotation of the spin tub 19a causes the wash water contained therein to be flung therefrom by centrifugal force and then causes water absorbed by the clothes to be extracted therefrom by centrifugal action and flung from the spin tub 19a. The water flung from the spin tub 19a is caught by the drain tub 15, whereby it is pumped to the drain plumbing, not shown, by the operating pump previously mentioned that is housed within the casing 18 of the unitary mechanism 16. In the arrangement, the operative mechanism housed in the casing 18 is selectively responsive to the direction of rotation of the rotor of the electric drive motor 40 in order to select one or the other of the two corresponding actions of the machine 10 in the obvious manner, whereby washing and water-extraction actions may be selectively effected upon the clothes contained in the spin tub 19a by selectively controlling the electric drive motor 40 in order to cause rotation of the rotor thereof in the respective forward and reverse directions as required, and as explained more fully hereinafter.

Further, the machine 10 comprises a water supply system indicated schematically as including a hot water supply pipe 21 and a cold water supply pipe 22, as well as a delivery tube 25 directly communicating with the open top of the spin tub 19a. In the arrangement a valve 23 is arranged in the hot water supply pipe 21 and a valve 24 is arranged in the cold water supply pipe 22. The valve 23 is of the solenoid-operated type, the solenoid of which is indicated at 23a; and similarly, the valve 24 is of the solenoid-operated type, the solenoid of which is indicated at 24a. Moreover, the valves 23 and 24 are biased into their closed positions. When the solenoid 23a is energized, the valve 23 is operated into its open position so that hot water is supplied from the hot water supply pipe 21 via the tube 25 into the spin tub 19a; and when the solenoid 24a is energized, the valve 24 is operated into its open position so that cold water is supplied from the cold water supply pipe 22 via the tube 25 into the spin tub 19a. Of course, it will be understood that the conjoint operations of the valves 23 and 24 into their open positions bring about the supply of warm water via the tube 25 into the spin tub 19a, as a consequence of the mixing of the hot water from the hot water supply pipe 21 and the cold water from the cold water supply pipe 22.

Also a pressure regulator 26 of conventional construction and arrangement is disposed in the delivery tube 25; which pressure regulator 26 is characterized by producing an outlet pressure therefrom at about 5 pounds per square inch gauge when the inlet pressure is in the general range 15 to 100 pounds per square inch gauge. However, this pressure regulator 26 is not capable of maintaining substantially constant the outlet pressure therefrom, when the inlet pressure thereto is below about 15 pounds/sq. in. gauge. For example, the outlet pressures therefrom may be respectively 3½ and 2½ pounds/sq. in. gauge, when the inlet pressures thereto are respectively 10 and 5 pounds/sq. in. gauge. Specifically, a conventional flexible diaphragm having a flow opening therethrough has this operating characteristic; and the pressure regulator 26 may advantageously be of this well-known and conventional construction. In the machine 10, the outlet pressure from the pressure regulator 26 of about 5 pounds/sq. in. gauge is productive of a rate of flow of water through the delivery tube 25 and into the spin tub 19a of about 3 gallons/min.

Hence, it will be appreciated that the rate of flow of water from the delivery tube 25 into the spin tub 19a is substantially constant and at about 3 gallons/min., when either one of the valves 23 or 24 occupies its open position, or when both of them are open, provided the water pressure in the corresponding water pipe 21 or 22 is at least as high as about 15 pounds/sq. in. gauge. However, when the water pressure in one of the water pipes 21 or 22 is below about 15 pounds/sq. in. gauge, opening of the corresponding valve 23 or 24 results in a flow of water through the delivery tube 25 and into the spin tub 19a at a rate below 3 gallons/min., and at a rate that is proportional to the water pressure in the water pipe 21 or 22 from which the water is supplied.

Further, two pressure switches PS1 and PS2 are operatively connected to the delivery tube 25 outwardly of the outlet of the pressure regulators 26; whereby the pressure switches PS1 and PS2 are responsive to the pressure of the water in the delivery tube 25 as it is being introduced therefrom into the spin tub 19a. In the arrangement, the pressure switch PS1 may be arranged to open at a medium water pressure (for example, 3½ pounds/sq. in. gauge) in the delivery tube 25, and the pressure switch PS2 may be arranged to open at a low water pressure (for example, 2½ pounds/sq. in. gauge) in the delivery tube 25. Thus, when the water pressure in the delivery tube 25 is relatively high (for example, above 3½ pounds/sq. in gauge), both of the pressure switches PS1 and PS2 occupy closed positions; and of course, this is the normal case (for example, 5 pounds/sq. in. gauge), when the pressure in the water pipes 21 and 22 is at least as high as about 15 pounds/sq. in. gauge, as previously noted. Should the water pressure in the delivery tube 25 fall from the high pressure of about 5 pounds/sq. in. gauge to the medium pressure of about 3½ pounds/sq. in. gauge, the pressure switch PS1 is opened, while the pressure switch PS2 remains closed. Of course low pressure of about 2½ pounds/sq. in. gauge in the delivery tube 25 causes both of the pressure switches PS1 and PS2 to open, as previously noted.

In the machine 10, the water supply system, including the valves 23 and 24, the pressure regulator 26 and the pressure switches PS1 and PS2, is suitably housed in the casing 12.

The rear portion of the top wall 13 carries an upstanding backsplash 27 that, in turn, carries manually settable control equipment that is incorporated in the control circuit of the machine 10. Specifically, the left-hand side of the backsplash 27 carries a panel 28 behind which there is mounted: a wash water temperature control switch 110, a rinse water temperature control switch 120, a water level control switch 130 and a select water level control switch 140; which switches are of the pushbutton type and readily accessible from the front of the machine 10. The right-hand side of the backsplash 27 carries a program controller 50 that includes a rotatably mounted operating shaft 51 projecting forwardly through a cooperating hole provided in the front wall of the backsplash 27 and carrying on the extreme front end thereof a manually operable dial 52 that cooperates with an associated index marker 53 mounted upon the front wall of the backsplash 27.

As best shown in FIG. 5, the wash water temperature control switch 110 is of the manually operable pushbutton type, including three individual pushbuttons 111, 112 and 113 that are suitably interlocked so that only one of these pushbuttons may be operated at any time and so that the operation or depression of any one of these pushbuttons effects the restoration or projection of the last previously operated one of these pushbuttons. Similarly, the rinse water temperature control switch 120 is of the manually operable pushbutton type, including two individual pushbuttons 121 and 122 that are suitably interlocked in the manner previously explained. Similarly, the water level control switch 130 is of the manually operable pushbutton type, including four individual pushbuttons 131, 132, 133 and 134 that are suitably interlocked in the manner previously explained. Preferably, the pushbutton switches 110, 120 and 130 are of the construction and arrangement of that disclosed in U.S. Patent No. 2,431,904, granted December 2, 1947 to John L. Andrews. Thus, it will be understood that in any one of these pushbutton switches 110, etc., when any one of the individual pushbuttons 111, etc., is manually operated, it remains in its operated or depressed position until another one of these individual pushbuttons 112, etc., is subsequently operated into its depressed position, so as to restore into its projected position, the previously last operated one of these individual pushbuttons 111, etc. Moreover, each of these pushbutton switches is preferably provided with a color control illuminating arrangement of the character of that disclosed in U.S. Patent No. 2,437,555, granted on March 9, 1948 to Gregory L. Rees. However, in the interest of simplification, the color illuminating system that is normally incorporated in each of these pushbutton switches 110, etc., has been omitted from the circuit drawing of FIG. 5. Preferably, the select water level control switch 140 is of the simple manually operable pushbutton type, including a single pushbutton 141 that is normally biased by an associated compression spring 142 into its normal or projected position; whereby the pushbutton 141 may be manually actuated against the bias of the compression spring 142 into its operated or depressed position.

In the control switch 110, the individual pushbuttons 111, 112 and 113 respectively comprise hot and warm and cold pushbuttons; the hot pushbutton 111 controls an associated pair of contacts 113; the warm pushbutton 112 controls two associated pairs of contacts 115 and 116; and the cold pushbutton 113 controls an associated pair of contacts 117. In the control switch 120, the individual pushbuttons 121 and 122 respectively comprise cold and warm pushbuttons; and the warm pushbutton 122 controls an associated pair of contacts 123. In the control switch 130, the individual pushbuttons 131, 132, 133 and 134 respectively comprise 60% partial fill, 80% partial fill, normal fill and extra fill pushbuttons; the 60% partial fill pushbutton 131 controls three associated pairs of contacts 135, 136 and 137; the 80% partial fill pushbutton 132 controls three associated pairs of contacts 138, 139 and 131'; and the normal fill pushbutton controls two associated pairs of contacts 132' and 133'. In the control switch 140, the single pushbutton 141 is only momentarily manually operable and is provided with a contact bridging member 143 controlling an associated pair of contacts.

As shown in FIG. 6, the program controller 50 further comprises a plurality of insulating cams C1 to C10, inclusive, that are rigidly secured to the operating shaft 51. The cams C1, C2, C3, C4, C5, C6, C7, C8, C9 and C10 respectively control switch springs H, C, P, S4, S2, MP, F2, F1, F3 and B. The switch spring H is selectively operative into open and closed positions with respect to each of upper and lower cooperating switch springs HF and HR and also into open position with respect to both of these switch springs; the switch spring C is selectively operative into open and closed positions with respect to each of upper and lower cooperating switch springs CF and SW and also into open position with respect to both of these switch springs; the switch P is selectively operative into open and closed positions with respect to an upper cooperating switch spring PR; the switch spring S4 is selectively operative into open and closed positions with respect to each of upper and lower cooperating switch springs J2 and K2 and also into open position with respect to both of these switch springs; the switch spring S2 is selectively operative into open and closed positions with respect to each of upper and lower cooperating switch springs K1 and J1 and also into open position with respect to both of these switch springs; the switch spring MP is selectively operative into open and closed positions with respect to each of upper and lower cooperating switch springs S and W and also into open position with respect to both of these switch springs; the switch spring F2 is selectively operative into open and closed positions with respect to each of upper and lower cooperating switch springs NF and 6F and also into open position with respect to both of these switch springs;

the switch spring F1 is selectively operative into open and closed positions with respect to each of upper and lower cooperating switch springs PF2 and PF1 and also into open position with respect to both of these switch springs; the switch spring F3 is selectively operative into open and closed positions with respect to an upper cooperating switch spring 7F; and the switch spring B is selectively operative into open and closed positions with respect to an upper cooperating switch spring BP.

The operating shaft 51 has a "rotary start" position, as illustrated in FIG. 6, wherein the switch spring H engages the switch spring HF and disengages the switch spring HR, the switch spring C engages the switch spring CF and disengages the switch spring SW, the switch spring P disengages the switch spring PR, the switch spring S4 engages the switch spring K2 and disengages the switch spring J2, the switch spring S2 engages the switch spring J1 and disengages the switch spring K1, the switch spring MP engages the switch spring W and disengages the switch spring S, the switch spring F2 disengages both of the switch springs NF and 6F, the switch spring F1 disengages both of the switch springs PF2 and PF1, the switch spring F3 disengages the switch spring 7F, and the switch spring B disengages the switch spring BP.

Also, the operating shaft 51 is mounted for longitudinal axial movement, as well as for the rotary movement previously described; whereby the operating shaft carries a contact bridging member 60 that is adapted selectively to bridge and to unbridge an associated pair of contacts and constituting a line switch that is employed for a purpose more fully explained hereinafter. More particularly, when the manually operable dial 52 is depressed, moved longitudinally toward the front wall of the backsplash 27, the operating shaft 51 is moved longitudinally inwardly so as to actuate the line switch 60 into its open position; conversely, when the manually operable dial 52 is withdrawn, or pulled out, away from the front wall of the backsplash 27, the operating shaft 51 is moved longitudinally outwardly so as to actuate the line switch 60 into its closed position.

Also, the program controller comprises a shaft 54 that is mounted only for rotary movement; and the outer end of the shaft 54 is connected to the adjacent inner end of the operating shaft 51 by an associated sleeve-like connector 55 that accommodates the relative longitudinal axial sliding movement of the operating shaft 51 with respect to the shaft 54, while maintaining the normal rotary connection between the shaft 54 and the operating shaft 51. Further, the program controller 50 comprises a timer motor 55 of the synchronous type, preferably a "Telechron" timer motor that is provided with an operating shaft 56 connected to a conventional escapement mechanism 57 having a driven shaft 58 that is connected by a friction clutch 59 to the adjacent end of the rotatably mounted shaft 54. In the arrangement, the friction clutch 59 includes two cooperating friction plates that are respectively connected to the adjacent ends of the shafts 54 and 58, thereby to accommodate rotation of the shaft 54 with the operating shaft 51 under the manual control of the manual dial 52, without interference with the normal operation of the escapement mechanism 57. In the program controller 50, continuous operation of the timer motor 55 effects intermittent operation of the escapement mechanism 57, whereby at the expiration of each time interval of 45 seconds, the driven shaft 58 is operated or rotated one step of 6°, thereby imparting a corresponding step of rotation through the friction clutch 59 to the shaft 54 and consequently to the operating shaft 51 and the manual dial 52 cooperating with the index marker 53.

Figure 2:
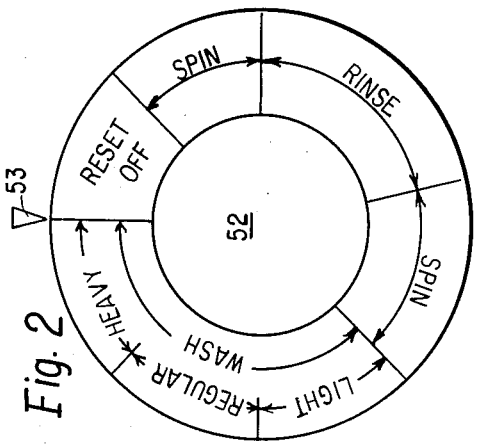
FIG. 2 is a plan view of the manually operable dial forming a part of the program controller that is incorporated in the electric control circuit of the machine shown in FIG. 1.
Figure 3:
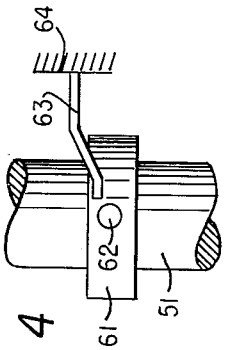
FIG. 3 is an enlarged lateral sectional view of the inner end of the drive shaft forming a part of the program controller mentioned.
Figure 4:
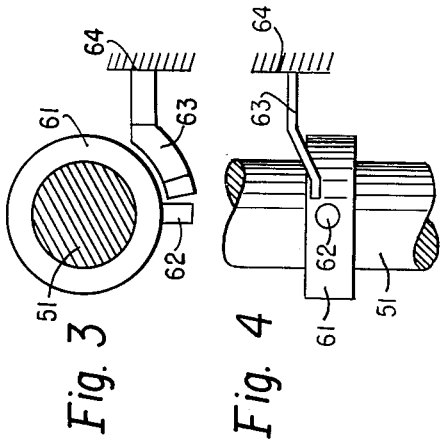
FIG. 4 is an enlarged fragmentary side elevational view of the inner end of the drive shaft, as shown in FIG. 3.

Further, the program controller 50 comprises longitudinal or axial reset mechanism, as best shown in FIGS. 3, 4 and 6, and that essentially comprises a ring or sleeve 61 rigidly affixed to the operating shaft 51 and carrying an outwardly or radially projecting pin 62. In turn, the pin 62 cooperates with a reset spring 63 that is externally supported, as indicated at 64. In the arrangement, when the operating shaft 51 occupies its "rotary start" position illustrated in FIGS. 3, 4 and 6, the manual dial 52 may be manually moved by the operator outwardly with respect to the front wall of the backsplash 27, whereby the operating shaft 51 is moved from its "axial stop" position, illustrated in FIGS. 3, 4 and 6, into its "axial start" position. When the operating shaft 51 is thus moved into its "axial start" position, the line switch 60 is closed and the pin 62 carried by the ring 61 is moved axially outwardly with respect to the extreme outer end of the reset spring 63 (the pin 6 is moved above the extreme outer end of the reset spring 63, as illustrated in FIG. 4). As explained more fully hereinafter, at this time, the timer motor 55 effects step-by-step rotation of the operating shaft 51 in the clockwise direction, as viewed in FIGS. 2 and 3, through the escapement mechanism 57, whereby the operating shaft 51 is rotated out of its normal rotary position. After approximately 330° of such rotary movement of the operating shaft 51 in the clockwise direction, as viewed in FIG. 3, the pin 62 is rotated below the extreme outer end of the reset spring 63 so that continued rotation of the operating shaft 51 in the next 30° and back into its "rotary start" position causes cooperation between the pin 62 and the extreme outer end of the reset spring 63 so that the operating shaft 51 is moved inwardly with respect to the front wall of the backsplash 27 (downwardly with reference to the reset spring 63, as viewed in FIG. 4) and back into its "axial stop" position. When the operating shaft 51 is thus moved axially back into its "axial stop" position, the line switch 60 is opened in order to terminate operation of the timer motor 55, whereby further rotation of the operating shaft 51 is arrested when it occupies its "rotary start" position, as well as its "axial stop" position.

Referring now to FIG. 2, the manually operable control dial 52 is provided with an annular skirt carrying indicia cooperating with the index marker 53; this indicia is circumferentially arranged and includes a "heavy wash" segment, a following "regular wash" segment, a following "light wash" segment, a following "spin" segment, a following "rinse" segment, a following "spin" segment and an ultimate "reset-off" segment, the segments mentioned being disposed in the order named and reading in the counterclockwise direction. As explained more fully hereinafter: the beginning of the "heavy wash" segment constitutes a "start-fill" position therefor, whereby this selection is productive of a wash cycle involving operation of the agitator 20a during a time interval of about 15 minutes; the beginning of the "regular wash" segment constitutes a "start-fill" position therefor, whereby this selection is productive of a wash cycle involving operation of the agitator 20a during a time interval of about 9 minutes; and the beginning of the "light wash" segment constitutes a "start-fill" position therefor, whereby this selection is productive of a wash cycle involving operation of the agitator 20a during a time interval of about 3 minutes. Each of the three wash selections mentioned involves a normal fill time interval of about 3¾ minutes during which water is filled into the spin tub 19a. Further, it is noted that the beginning of the "heavy wash" segment also constitutes the previously discussed "rotary start" position of the operating shaft 51 of the program controller 50.

Referring to FIG. 6, the drive motor 40 is of the 4-pole, split-phase, induction type, including a reversible rotor 44 and a cooperating stator carrying a 4-pole run winding 42 and a 4-pole start winding 41. When the run 42 is energized with forward polarity, the rotor 44 runs in the forward direction at about 1725 r.p.m., effecting oscillation of the agitator 20a at a rate of about 64 cycles per minute. When the run winding 42 is energized with reverse polarity, the rotor 44 runs in the reverse direction at about 1725 r.p.m., effecting spinning of the spin tube 19a at a speed of about 640 r.p.m. Also, the rotor 44 is provided with a rotatable operating shaft 44′ to which there is operatively conected a speed responsive device 46 that is illustrated as being of the flyball governor type; which device 46 controls two switch springs 43 and 45. In turn, the switch spring 43 controls two switch springs 47 and 48, and the switch spring 45 controls a switch spring 49. In the arrangement, when the rotor 44 is at rest, the device 46 is controlled to cause the switch spring 43 to disengage the switch spring 47 and to engage the switch spring 48 and to cause the switch spring 45 to engage the switch spring 49. When the rotor 44 is accelerated in either direction to a speed of about 60% of its normal running speed, the device 46 is controlled to cause the switch spring 43 to disengage the switch spring 48 and to engage the switch spring 47 and to cause the switch spring 45 to disengage the switch spring 49. Of course, upon stopping of the rotor 44, the device 46 is controlled to cause the return of the switch springs 43 and 45 back into their normal positions, as illustrated in FIG. 6. Also, as indicated in FIG. 6, the hot water solenoid 23a and the cold water solenoid 24a are represented as two rectangles.

Considering now in greater detail the control circuit, as illustrated in FIGS. 5 and 6, the same comprises a terminal block 170 to which a source of electric power supply of 118-volts, single-phase, A.-C., is connected; this source including two line conductors L1 and L2. Also, the machine 10 comprises a thermal protective device 171, and a balance switch 172. In the arrangement, the thermal protective device 171 may be of any suitable type, such, for example, as a resettable circuit breaker, operative into an open or trip position in response to an overload current condition for a given short time interval. The balance switch 172 may be of any conventional type, and is operative from a normal closed position into an open position in response to abnormal vibration of the machine 10, such as may occur in a spinning operation of the spin tube 19a with a heavy unbalanced load of clothes therein. In the arrangement, the line conductor L2 is connected via the thermal protective device 171 and the balance switch 172 in series relation to a supply conductor 173.

Considering now in greater detail the wiring diagram: the switch springs HF, H and HR respectively terminate three conductors 178, 177 and 179; the switch springs CF, C and SW respectively terminate three conductors 180, 177′ and 174; the switch springs PR and P respectively terminate the conductor 174 and the conductor 173; the switch springs J2, S4 and K2 respectively terminate three conductors 182, 184 and 175; the switch springs K1, S2 and J1 respectively terminate the conductor 175, a conductor 183 and the conductor 182; the switch springs S, MP and W respectively terminate a conductor 181, a conductor 176 and the conductor 181; the switch springs NF, F2 and 6F respectively terminate a conductor 187, the conductor 173 and a conductor 192; the switch springs PF2, F1 and PF1 respectively terminate a conductor 186, the conductor 173 and a conductor 185; the switch springs 7F and F3 respectively terminate the conductors 173 and 175; and the switch springs BP and B respectively terminate the line conductor L1 and the conductor 176. The contacts of the line switch respectively terminate the line conductor L1 and the conductor 176. The terminals of the timer motor 55 are respectively conected to the conductors 173 and 176.

In the control switch 110: the contacts 114 are respectively connected to the conductors 174 and 178; the contacts 115 are respectively connected to the conductors 174 and 178; the contacts 116 are respectively connected to the conductors 174 and 180; and the contacts 117 are respectively connected to the conductors 174 and 180. In the control switch 120, the contacts 123 are respectively connected to the conductors 174 and 179. In the control switch 130: the contacts 135 are respectively connected to the conductors 187 and 175; the contacts 136 are respectively connected to the conductor 186 and to a conductor 189; the contacts 137 are respectively connected to a conductor 188 and to the conductor 185; the contacts 138 are respectively connected to the conductors 192 and 175; the contacts 139 are respectively connected to the conductors 187 and 175; the contacts 131′ are respectively connected to the conductors 186 and 188; the contacts 132′ are respectively connected to the conductors 192 and 189; and the contacts 133′ are respectively connected to the conductors 187 and 188. In the control switch 140 the two contacts governed by the contact bridging member 143 respectively terminate the conductors 175 and 173. The two switch springs of the pressure control switch PS1 respectively terminate the two conductors 188 and 175; and the two switch springs of the pressure control switch PS2 respectively terminate the two conductors 189 and 175.

The hot water solenoid 23a is bridged across the conductors 176 and 177; and the cold water solenoid 24a is bridged across the conductors 176 and 177′. In the drive motor 40: the run winding 42 is bridged across the conductors 175 and 181; the start winding 41 is bridged across the conductors 183 and 184 the switch springs 45 and 49 are respectively connected to the conductors 181 and 182; and the switch springs 43, 48 and 47 are respectively connected to the conductors 173, 174 and 175.

Before proceeding with the particular controls that are carried out by the program controller 50 in conjunction with the various control switches 110, etc., in the automatic cycle of operation of the control circuit, reference is first made to the time-sequence control chart of FIG. 7, wherein there are disclosed the fundamental items of the program controller 50 including the control cams C1 to C8, inclusive, the switch spring sets H-HF-HR, etc., respectively governed by the control cams C1, etc., as well as the sequence of the opening and the closing of the contact sets in the cycle of operation of the program controller 50. This chart is read from left to right; and the closure time intervals of each pair of switch springs are indicated by solid or filled-in blocks. For example: the control cam C1 actuates the switch spring H to close the switch spring HF and to open the switch spring HR during the first six steps of the cycle; the control cam C1 then actuates the switch spring H to open both of the switch springs HF and HR during the next two steps of the cycle; the control cam C1 then actuates the switch spring H to close the switch spring HF and to open the switch spring HR during the next six steps of the cycle; etc. Of course, the other control cams C2, etc., govern the other switch spring sets C-CF-SW, etc., in a similar manner and simultaneously in the cycle of the program controller 50 as is evident from an examination of this chart.

Now assuming that an automatic program is to be carried out in the machine 10, when the manual dial 52 of the program controller 50 occupies its "rotary start" position at the beginning of the "heavy wash" segment and that the operating shaft 51 is in its "axial stop" position, the circuits are in the condition illustrated in FIG. 6. Further, assuming that a hot wash and a cold rinse are desired in the program, whereby the hot pushbutton 111 in the control switch 110 is actuated and the cold pushbutton 121 in the control switch 120 is actuated. Also, assuming that a normal water level is desired in the wash cycle, the normal fill pushbutton 133 in the control switch 130 is actuated. Finally, it is assumed that this desired program requires the heavy wash of the clothes in the wash cycle, corresponding to operation of the agitator 20a during a time interval of about 15 minutes. At this time the circuits are in the preselected condition illustrated in FIGS. 5 and 6; and hereinafter, this particular program thus preselected is referred to as the "basic program."

The operator then places the clothes and the required detergent in the spin tub 19a, and closes the top door 14. In order to initiate this preselected basic program, the operator merely manually moves the control dial 52 outwardly with respect to the front wall of the backsplash 27, whereby the operating shaft 51 is moved from its "axial stop" position into its "axial start" position so as to close the line switch 60.

In the present example, closure of the line switch 60 completes a circuit for operating the timer motor 55 via the elements L1, 60, 176, 55 and 173; whereby the timer motor 55 drives or rotates the operating shaft 51 of the program controller step by step in the clockwise direction, as viewed in FIG. 2, out of its "rotary start" position, this drive connection including the elements 56, 57, 58, 59, 54 and 55. Also, it is noted that at this time, since the operating shaft 51 occupies its "axial start" position, the pin 62 is disposed outwardly of the outer end of the reset spring 63 (above the reset spring 63, as shown in FIGS. 3 and 4); which arrangement is subsequently involved in resetting the operating shaft 51 back into its "axial stop" position, as explained hereinafter. Also, closure of the line switch 60 completes a circuit for energizing the hot solenoid 23a, this circuit including the elements L1, 60, 176, 23a, 177, H, HF, 178, 114, 174, 48 43 and 173. Energization of the hot solenoid 23a effects opening of the hot water valve 23, whereby hot water flows from the hot water pipe 21 via the open hot water valve 23 and the pressure regulator 26 into the delivery tube 25, and therefrom into the spin tub 19a.

At this time, it is assumed that the pressure of the water in the hot water pipe 21 exceeds about 15 pounds/sq. in. gauge, whereby the pressure regulator 26 operates to cause a pressure of about 5 pounds/sq. in. gauge in the delivery tube 25, so that both of the pressure switches PS1 and PS2 are operated into their closed positions and the water is delivered at the rate of about 3 gallons/min. into the spin tub 19a from the delivery tube 25.

When the operating shaft 51 of the program controller 50 is rotated into position #6 (See the chart of FIG. 7). the control cam C7 actuates the switch spring F2 to close the switch spring NF, thereby to complete forward start and run circuits for respectively energizing the start and run windings 41 and 42 of the drive motor 40. The forward start circuit mentioned includes the elements L1, 60, 176, MP, W, 181, 45, 49, 182, J1, S2, 183, 41, 184, S4, K2, 175, PS1 closed, 188, 133', 187, NF, F2 and 173; and the forward run circuit mentioned includes the elements L1, 60, 176, MP, W, 181, 42, 175, PS1 closed, 188, 133', 187, NF, F2 and 173. The drive motor 40 starts rotating its rotor 44 in the forward direction; whereby the centrifugal device 46 actuates the switch springs 43 and 45, when the rotor 44 gains about 60% of its normal running speed. Specifically, the device 46 actuates the switch spring 45 to open the switch spring 49 and actuates the switch spring 43 to open the switch 48 and to close the switch spring 47. Opening of the switch springs 45, 49 interrupts the forward start circuit for the start winding 41. Opening of the switch springs 43, 48 interrupts the previously traced circuit for energizing the hot water solenoid 23a; whereby the hot water valve 23 returns to its closed position to cut-off the supply of hot water to the spin tub 19a. Closure of the switch springs 43, 47 completes a forward holding circuit for energizing the run winding 42 of the drive motor 40; which forward holding circuit includes the elements L1, 60, 176, MP, W, 181, 42, 175, 47, 43 and 173. Closure of the forward holding circuit effects continued energization of the run winding 42, so that the rotor 44 accelerates on into its normal running speed in the forward direction. Forward running of the rotor 44 effects oscillation of the agitator 20a to produce a washing action upon the clothes suspended in the hot water in the spin tub 19a in the usual manner. In is noted that operation of the drive motor 40 was thus initiated in position #6 of the operating shaft 51; whereby the hot water valve 23 was closed, as described above, with the result that the hot water was supplied into the spin tub 19a during a corresponding time interval of about 3¾ minutes, producing a normal fill of hot water therein for use in the wash cycle.

The washing action of the agitator 20a is thus initiated in position #6; and after a time interval the operating shaft 51 is rotated into position #23, whereby the control cam C3 actuates the switch spring P to engage the switch spring PR. After an additional time interval of ¾ minute, the operating shaft 51 is rotated into position #24, whereby the control cam C3 actuates the switch spring P to disengage the switch spring PR. Thus, the switch spring P closes and then opens the switch spring PR; whereby for a time interval of ¾ minute a circuit is completed for energizing the cold water solenoid 24a, so that the cold water valve 24 is thus open during this short time interval in order to insure substantially complete filling of the spin tub 19a or to effect overflowing thereof, depending upon the volume of water initially introduced thereinto. This circuit for energizing the cold water solenoid 24a, when completed, includes the elements L1, 60, 176, 24a, 177', C, SW, 174, P, PR and 173.

The washing action of the agitator 20a thus initiated in position #6 of the operating shaft 51 continues for a time interval of 15 minutes, whereupon the operating shaft 51 is rotated into position #26, with the result that the control cam C26 actuates the switch spring MP to open the switch spring W. Opening of the switch springs MP, W interrupts the forward holding circuit for energizing the run winding 42 of the drive motor 40, so that the rotor 44 stops to terminate the washing action of the agitator 20a in the spin tub 19a. Stopping of the rotor 44 causes the device 46 to reset the switch springs 43 and 45 into their rest positions, as shown in FIG. 6.

After a pause for a time interval of ¾ minute, the operating shaft 51 is rotated into position #27, whereupon the control cam C9 actuates the switch spring F3 to close the switch spring 7F, thereby to complete reverse start and run circuits for respectively energizing the start and run windings 41 and 42 of the drive motor 40. The reverse start circuit mentioned includes the elements L1, 60, 176, MP, S, 181, 45, 49, 182, J2, S4, 184, 41, 183, S2, K1, 175, F3, 7F and 173; and the reverse run circuit mentioned includes the elements L1, 60, 176, MP, S, 181, 42, 175, F3, 7F and 173. The drive motor 40 starts rotating its rotor 44 in the reverse direction; whereby the centrifugal device 46 actuates the switch springs 43 and 45 at about 60% normal running speed. Specifically, the switch spring 45 opens the switch spring 49 to interrupt the reverse start circuit, and the switch spring 43 closes the switch spring 47 to complete a reverse holding circuit independent of the switch springs F3, 7F. The reverse holding circuit mentioned includes the elements L1, 60, 176, MP, S, 181, 42, 175, 47, 43 and 173. The rotor 44 thus accelerates into the normal running speed in the reverse direction; thereby to effect spinning of the spin tub 19a so as to expel the wash water therefrom and from the clothes therein. The wash water is caught in the drain tub 15 and pumped to the drain plumbing, not shown, in the usual manner.

The spinning action of the spin tub 19a is thus initiated in position #27; and after a time interval the operating shaft 51 is rotated into position #30, whereby the control cam C3 actuates the switch spring P to engage the switch spring PR. After an additional time interval of ¾ minute, the operating shaft 51 is rotated into position #31, whereby the control cam C3 actuates the switch spring P to disengage the switch spring PR. Thus, the switch spring P closes and then opens the switch spring PR; whereby for a time interval of ¾ minute a circuit is completed for energizing the cold solenoid 24a, so that the cold water valve 24 is thus open during this short time interval in order to effect spraying with cold water of the clothes in the spinning spin tub 19a. This circuit for energizing the cold water solenoid 24a, when completed, includes the elements L1, 60, 176, 24a, 177′, C, SW, 174, PR, P and 173.

The spinning action of the spin tub 19a thus initiated in position #27 of the operating shaft 51 continues for a time interval of 4½ minutes, whereupon the operating shaft 51 is rotated into position #33, with the result that the control cam C6 actuates the switch spring MP to open the switch spring S. Opening of the switch springs MP, S, interrupts the forward holding circuit for energizing the run winding 42 of the drive motor 40, so that the rotor 44 stops to terminate the spinning action of the spin tub 19a. Stopping of the rotor 44 causes the device 46 to reset the switch springs 43 and 45 into their rest positions, as shown in FIG. 6.

After a pause for a time interval of ¾ minute, the operating shaft 51 is rotated into position #34, whereby the control cam C2 actuates the switch spring C to close the switch spring SW, thereby to complete a circuit for energizing the cold solenoid 24a, this circuit including the elements L1, 60, 176, 24a, 177′, C, SW, 174, 48, 43 and 173. Energization of the cold solenoid 24a effects opening of the cold water valve 24, whereby cold water is introduced from the cold water pipe 22 via the delivery tube 25 into the spin tub 19a.

Again it is assumed that the pressure of the water in the cold water pipe 22 exceeds about 15 pounds/sq. in. gauge, whereby the pressure regulator 26 operates to cause a pressure of about 5 pounds/sq. in. gauge in the delivery tube 25, so that both of the pressure switches PS1 and PS2 are operated into their closed positions and the water is delivered at the rate of about 3 gallons/min. into the spin tub 19a from the delivery tube 25.

When the operating shaft 51 of the program controller 50 is rotated into position #39, the control cam C7 actuates the switch spring F2 to close the switch spring NF, thereby to complete forward start and run circuits for respectively energizing the start and run windings 41 and 42 of the drive motor 40. The forward start circuit mentioned includes the elements L1, 60, 176, MP, W, 181, 45, 49, 182, J1, S2, 183, 41, 184, S4, K2, 175, PS2 closed, 189, 132′, 192, 6F, F2 and 173; and the forward run circuit mentioned includes the elements L1, 60, 176, MP, W, 181, 42, 175, PS2 closed, 189, 132′, 192, 6F, F2 and 173. The drive motor 40 starts rotating its rotor 44 in the forward direction; whereby the centrifugal device 46 actuates the switch springs 43 and 45 in the manner previously described. The switch spring 45 opens the switch spring 49 to interrupt the forward start circuit; and the switch spring 43 closes the switch spring 47 to complete the forward holding circuit for energizing the run winding 42 of the drive motor 40. Also, opening of the switch springs 43, 48 interrupts the previously traced circuit for energizing the cold water solenoid 24a; whereby the cold water valve 24 returns to its closed position to cut-off the supply of cold water to the spin tub 19a. The rotor 44 is accelerated into its normal running speed in the forward direction so as to effect oscillation of the agitator 20a to produce a deep agitated rinsing action upon the clothes suspended in the cold water in the spin tub 19a in the usual manner. It is noted that operation of the drive motor 40 was thus initiated in position #39 of the operating shaft 51; whereby the cold water valve 24 was closed, as described above, with the result that the cold water was supplied into the spin tub 19a during a corresponding time interval of about 3¾ minutes, producing a normal fill of cold water therein for use in the deep agitated rinse cycle.

The deep agitated rinsing action thus initiated in position #39 of the operating shaft 51 continues for a time interval of ¾ minute; whereupon the operating shaft 51 is rotated into position #40 to cause the control cam C3 to actuate the switch spring P to close the switch spring PR. Closure of the switch springs P, PR completes an alternative circuit for energizing the cold solenoid 24a; which alternative circuit mentioned includes the elements L1, 60, 176, 24a, 177′, C, SW, 174, PR, P and 173. Energization of the cold water solenoid 24a effects opening of the cold water valve 24 and the consequent introduction of cold water into the spin tub 19a during oscillation of the agitator 20a, with the result that the deep agitated rinsing action is converted into a deep agitated overflow rinsing action upon the clothes, the cold water overflowing the top of the spin tub 19a and falling into the drain tub 15.

This deep overflow agitated rinsing action initiated in position #40 of the operating shaft 51 is continued for a time interval of 2¼ minutes; whereupon the operating shaft 51 is rotated into position #43; wherein the control cam C3 actuates the switch spring P to open the switch spring PR so as to interrupt the previously traced alternative circuit for energizing the cold solenoid 24a in order to effect closure of the cold water valve 24 and the consequent cut-off of the supply of cold water to the spin tub 19a. At this time, the deep overflow agitated rinsing action is reconverted to a simple deep agitated rinsing action, and continues for an additional time interval of 1½ minutes; whereupon the operating shaft 51 is rotated into position #45; wherein the control cam C6 actuates the switch spring MP to open the switch spring W so as to interrupt the forward holding circuit for energizing the run winding 42 of the drive motor 40. The rotor 44 then stops to terminate the rinsing action in the spin tub 19a.

After a pause for a time interval of ¾ minute, the operating shaft 51 is rotated into position #46, whereupon the control cam C9 actuates the switch spring F3 to close the switch spring 7F, thereby to complete the previously traced reverse start and run circuits for respectively energizing the start and run windings 41 and 42 of the drive motor 40. The drive motor 40 starts rotating its rotor 44 in the reverse direction; whereby the centrifugal device 46 actuates the switch springs 43 and 45 in the manner previously described. The switch spring 45 opens the switch spring 49 to interrupt the reverse start circuit; and the switch spring 43 closes the switch spring 47 to complete the reverse holding circuit for energizing the run winding 42 of the drive motor 40. The rotor 44 is accelerated into its normal running speed in the reverse direction so as to effect spinning of the spin tub 19a in order to expel the rinse water therefrom and from the clothes therein.

The spinning action thus initiated in position #46 of the operating shaft 51 continues for a time interval of 6¾ minutes, whereupon the operating shaft 51 is rotated into position #55, with the result that the control cam C6 actuates the switch spring MP to open the switch spring S. Opening of the switch springs MP, S interrupts the reverse holding circuit for energizing the run winding 42 of the drive motor 40, so that the rotor 44 stops to terminate the spinning of the spin tub 19a.

Also the operating shaft in position #55 causes the control cam C10 to actuate the switch spring B to close the switch spring BP. Closure of the switch springs B, BP completes a direct path between the line conductor L1 and the conductor 176 and in parallel with the line switch 60; thereby to maintain completed the operating circuit for the timer motor 55 independently of the position of the line switch 60. In the next five steps of the operating shaft 51, between position #56 and position #60, the pin 62 rides under the reset spring 63, as illustrated in FIGS. 3 and 4; whereby the reset spring 63 acting upon the pin 62 forces the operating shaft 51 to move axially inwardly toward the front wall of the backsplash 27 (downwardly as shown in FIG. 4), whereby the operating shaft 51 is moved axially from its "axial start" position back into its "axial stop" position. This resetting of the operating shaft 51 back into its "axial stop" position effects opening of the line switch 60.

At this time the operating circuit for the timer motor 55 is maintained by virtue of the closed position of the switch spring B with respect to the switch spring BP. Thus, rotary stepping of the operating shaft 51 is continued so that the same is rotated through position #60 and back into position #1, the "rotary start" position of the operating shaft 51. In position #1, the operating shaft 51 causes the control cam C10 to actuate the switch spring B to open the switch spring BP, in order to interrupt the operating circuit for the timer motor 55 so as to arrest further rotary stepping of the operating shaft 51, when it is in position #1. At this time the operating shaft 51 occupies both its "axial stop" position and its "rotary start" position; the circuits are back into the conditions illustrated in FIGS. 5 and 6; and the preset basic program has been carried out by the program controller 50 on a timed basis. At this time, the operator may open the top door 14 and remove the clothes from the spin tub 19a, since the washing and rinsing and water-extracting actions have been performed thereupon in the machine 10 in the basic program described.

In the initial description of the carrying out of the basic program after presetting thereof, it was assumed that the pressure in the hot water pipe 21 and in the cold water pipe was in excess of about 15 pounds/sq. in. gauge, so that the pressure regulator 26 produced a pressure of about 5 pounds/sq. in. gauge in the delivery tube 25, so that both of the pressure switches PS1 and PS2 were operated into their closed positions.

Now assume that when this basic program is carried out after presetting thereof, the pressure in the water pipes 21 and 22 is somewhat below about 10 pounds/sq. in. gauge. In this event, when the hot water valve 23 is opened in position #1 of the operating shaft 51, the regulator 26 produces a pressure somewhat below about 3½ pounds/sq. in. gauge in the delivery tube 25, with the result that the pressure switch PS1 is open and the pressure switch PS2 is closed, at this time. Thus, in position #6 of the operating shaft 51 the closure of the switch springs F2, NF is without effect to start the drive motor 40, since the conductor 188 is disconnected at the open pressure switch PS1 from the conductor 175. However, when the operating shaft 51 is rotated into position #7, the control cam C7 closes the switch spring F2 to the switch spring 6F, whereby there are completed the forward start and run circuits for respectively energizing the start and run windings 41 and 42 of the drive motor 40. The portions of these circuits here pertinent include the elements L1, 60, 176, —, 175, PS2 closed, 189, 132', 192, 6F, F2 and 173. Operation of the drive motor 40 causes the speed responsive device 46 to open the switch springs 43, 48 so as to deenergize the hot solenoid 23a, thereby to close the hot water valve 23. Hence, in this case the hot water valve 23 is open for 6 units of time (6×¾=4½ minutes), instead of 5 units of time (5×¾=3¾ minutes), as in the case of the basic program when the pressure in the hot water pipe 21 is in excess of about 15 pounds/sq. in. gauge, as initially described.

This same shifting of starting of the drive motor 40 from position #39 to position #40 of the operating shaft 51 takes place in conjunction with the filling of the spin tub 19a with cold water for the rinsing cycle, whereby the cold water valve 24 is likewise maintained open for 6 units of time, instead of 5 units of time, as initially described. The circuit considerations herein are the same as described above and resulting from the open position of the pressure switch PS1 and the closed position of the pressure switch PS2.

In the immediately preceding description of the carrying out of the basic program after presetting thereof, it was assumed that the pressure in the water pipes 21 and 22 was somewhat below about 10 pounds/sq. in. gauge, so that the pressure regulator 26 produced a pressure somewhat below 3½ pounds/sq. in. gauge in the delivery tube, so that the pressure switch PS1 was operated into its open position and the pressure switch PS2 was operated into its closed position.

Now assume that when this basic program is carried out after presetting thereof, the pressure in the water pipes 21 and 22 is somewhat below about 5 pounds/sq. in. gauge. In this event, when the hot water valve 23 is opened in position #1 of the operating shaft 51, the pressure regulator 26 produces a pressure somewhat below about 2½ pounds/sq. in. gauge in the delivery tube 25, with the result that both of the pressure switches PS1 and PS2 are open, at this time. Thus, in position #6 of the operating shaft 51, the closure of the switch springs F2, NF is without effect (the conductor 188 is disconnected from the conductor 175 at the open pressure switch PS1); and likewise, in position #7 of the operating shaft 51, the closure of the switch springs F2, 6F is without effect (the conductor 189 is disconnected from the conductor 175 at the open pressure switch PS2). However, in position #8 of the operating shaft 51, the control cam C9 closes the switch spring F3 to the switch spring 7F, so as to complete the forward start and run circuits for the respective windings 41 and 42 of the drive motor 40; whereby the hot water valve 23 is closed, as previously explained. Hence, in this case the hot water valve 23 is open for 7 units of time (7×¾=5¼ minutes).

This same shifting of the starting of the drive motor 40 from position #39, as initially described, to position #41 of the operating shaft 51 takes place in conjunction with the filling of the spin tub 19a with cold water for the rinsing cycle, whereby the cold water valve 24 is likewise maintained open for 7 units of time. The circuit considerations herein are the same as described above and resulting from the open positions of the pressure switches PS1 and PS2.

Considering now the presetting of a first modified program, modified with respect to the basic program in the particular that only partial fill (60% of the normal fill) is desired in the spin tub 19a. The presetting of this first modified program is fundamentally the same as that previously described in conjunction with presetting of the basic program, except that in this case, the 60% fill pushbutton 131, instead of the normal fill pushbutton 133, is depressed in the water level control switch 130 prior to the manual operation of the control dial 52 into its "axial start" position, in the manner previously explained. In this case, the depression of the 60% fill pushbutton 131 in the wash level control switch 130 brings about the projection of the normal fill pushbutton 133 and the consequent opening of the contacts 132' and 133'. Also, the depression of the 60% fill pushbutton 131 brings about the closure of the contacts 135, 136 and 137, whereby the conductors 187, 186 and 185 are respectively connected to the conductors 175, 189 and 188. Closure of the line switch 60 completes the previously traced circuit for energizing the hot solenoid 23a so that the hot water valve 23 is opened to initiate the introduction of hot water into the spin tub 19a, when the operating shaft occupies position #1, as previously explained.

The subsequent operation of the apparatus depends upon the pressure of the water in the water supply system, as previously explained, whereby it is first assumed that the pressure mentioned is above about 15 pounds/sq. in. gauge, so that the pressure regulator 26 operates to produce a pressure in the delivery tube 25 that is about 5 pounds/sq. in. gauge; with the result that both of the pressure switches PS1 and PS2 are closed, at this time.

In this case, when the operating shaft 51 is operated into position #4, forward start and run circuits are completed for the respective windings 41 and 42 of the drive motor 40. The start circuit mentioned includes the elements L1, 60, 176, MP, W, 181, 45, 49, 182, J1, S2, 183, 41, 184, S4, K2, 175, PS1 closed, 188, 137, 185, PF1, F1 and 173. Accordingly, operation of the drive motor 40 is initiated to cause the speed responsive device 46 to open the switch springs 45, 49 in order to interrupt the previously traced circuit for energizing the hot solenoid 23a so as to bring about closure of the hot water valve 23, at this time.

Hence, the hot water valve 23 was opened in position #1 of the operating shaft 51 and closed in position #4 thereof; whereby the hot water valve 23 remained open during a corresponding time interval of 2¼ minutes, so as to produce a corresponding approximate 60% fill of the spin tub 19a with hot water for use in the washing cycle thus initiated.

Subsequently, the cold water valve 24 is likewise retained open for a time interval of 2¼ minutes to effect an approximate 60% fill of cold water into the spin tub 19a for use in the rinse cycle. The circuit considerations herein are the same as those described above, the cold water valve 24 being opened in position #34 of the operating shaft 51 and being closed in position #37 thereof, in this case.

Now assume that when this first modified program is carried out after presetting thereof, the pressure in the water supply system is somewhat below about 10 pounds/sq. in. gauge, so that the pressure regulator 26 operates to produce a pressure in the delivery tube 25 that is somewhat below about 3½ pounds/sq. in. gauge; with the result that the pressure switch PS1 is open and the pressure switch PS2 is closed, at this time.

In this case, in position #4 of the operating shaft 51, the closure of the switch springs F1, PF1 is without effect, since the open pressure switch PS1 disconnects the conductor 175 from the conductor 188. However, in position #5 of the operating shaft 51, the closure by the control cam C8 of the switch springs F1, PF2 completes the forward start and run circuits for the respective windings 41 and 42 of the drive motor 40. The start circuit mentioned includes the elements L1, 60, 176, MP, W, 181, 45, 49, 182, J1, S2, 183, 41, 184, S4, K2, 175, PS2 closed, 189, 136, 186, PF2, F1 and 173. Accordingly, operation of the drive motor 40 is initiated to cause the speed responsive device 46 to open the switch springs 43, 48 in order to interrupt the previously traced circuit for energizing the hot solenoid 23a so as to bring about closure of the hot water valve 23, at this time.

Hence, the hot water valve 23 was opened in position #1 of the operating shaft 51 and closed in position #5 thereof; whereby the hot water valve 23 remained open during a corresponding time interval of 3 minutes, so as to produce a corresponding approximately 60% fill of the spin tub 19a with hot water for use in the washing cycle thus initiated.

Subsequently, the cold water valve 24 is likewise retained open for a time interval of 3 minutes to effect an approximate 60% fill of cold water into the spin tub 19a for use in the rinse cycle. The circuit considerations herein are the same as those described above, the cold water valve 24 being open in position #34 of the operating shaft 51 and being closed in position #38 thereof, in this case.

Now assume that when this first modified program is carried out after presetting thereof, the pressure in the water supply system is somewhat below about 5 pounds/sq. in. gauge, so that the pressure regulator 26 operates in order to produce a pressure in the delivery tube 25 that is somewhat below about 2½ pounds/sq. in. gauge; with the result that both of the pressure switches PS1 and PS2 are opened, at this time.

In this case, in position #4 of the operating shaft 51, the closure of the switch springs F1, PF1 is without effect, since the open pressure switch PS1 disconnects the conductor 175 from the conductor 188. Likewise, in position #5 of the operating shaft 51, the closure of the switch spring F1, PF2 is without effect, since the open pressure switch PS2 disconnects the conductor 175 from the conductor 189. However, in position #6 of the operating shaft 51, the closure by the control cam C7 of the switch springs F2, NF completes the forward start and run circuits for the respective windings 41 and 42 of the drive motor 40. The start circuit mentioned includes the elements L1, 60, 176, MP, W, 181, 45, 49, 182, J1, S2, 183, 41, 184, S4, K2, 175, 135, 187, NF, F2 and 173. Accordingly, operation of the drive motor 40 is initiated to cause the speed responsive device 46 to open the switch springs 43, 48, in order to interrupt the previously traced circuit for energizing the hot solenoid 23a so as to bring about closure of the hot water valve 23, at this time.

Hence, the hot water valve 23 was opened in position #1 of the operating shaft 51 and closed in position #6 thereof; whereby the hot water valve 23 remained open during a corresponding time interval of 3¾ minutes, so as to produce a corresponding approximately 60% fill of the spin tub 19a with hot water for use in the washing cycle thus initiated.

Subsequently, the cold water valve 24 is likewise retained open for a time interval of 3¾ minutes to effect an approximate 60% fill of cold water into the spin tub 19a for use in the rinse cycle. The circuit considerations herein are the same as those described above, the cold water valve 24 being open in position #34 of the operating shaft 51 and being closed in position #39 thereof, in this case.

Considering now the presetting of a second modified program, modified with respect to the basic program in the particular that only partial fill (80% of the normal fill) is desired in the spin tub 19a. The presetting of this first modified program is fundamentally the same as that previously described in conjunction with presetting of the basic program, except that in this case, the 80% fill pushbutton 132, instead of the normal fill pushbutton 133, is depressed in the water level control switch 130 prior to the manual operation of the control dial 52 into its "axial start" position, in the manner previously explained. In this case, the depression of the 80% fill pushbutton 131 in the wash level control switch 130 brings about the projection of the normal fill pushbutton 133 and the consequent opening of the contacts 132' and 133'. Also, the depression of the 80% fill pushbutton 131 brings about the closure of the contacts 138, 139 and 131', whereby the conductors 192, 187 and 186 are respectively connected to the conductors 175, 189 and 188. Closure of the line switch 60 completes the previously traced circuit for energizing the hot solenoid 23a so that the hot water valve 23 is opened to initiate the introduction of hot water into the spin tub 19a when the operating shaft occupies position #1, as previously explained.

The subsequent operation of the apparatus depends upon the pressure of the water in the water supply system, as previously explained, whereby it is first assumed that the pressure mentioned is above about 15 pounds/sq. in. gauge, so that the pressure regulator 26 operates to produce a pressure in the delivery tube 25 that is about 5 pounds/sq. in. gauge; with the result that both of the pressure switches PS1 and PS2 are closed, at this time.

In this case, when the operating shaft 51 is operated into position #5, forward start and run circuits are completed for the respective windings 41 and 42 of the drive motor 40. The start circuit mentioned includes the elements L1, 60, 176, MP, W, 181, 45, 49, 182, J1, S2, 183, 41, 184, S4, K2, 175, PS1 closed, 188, 131', 186, PF2, FL and 173. Accordingly, operation of the drive motor 40 is initiated to cause the speed responsive device 46 to open the switch springs 43, 48 in order to interrupt the previously traced circuit for energizing the hot solenoid 23a so as to bring about closure of the hot water valve 23, at this time.

Hence, the hot water valve 23 was opened in position #1 of the operating shaft 51 and closed in position #5 thereof; whereby the hot water valve 23 remained open during a corresponding time interval of 3 minutes, so as to produce a corresponding approximately 80% fill of the spin tub 19a with hot water for use in the washing cycle thus initiated.

Subsequently, the cold water valve 24 is likewise retained open for a time interval of 3 minutes to effect an approximate 80% fill of cold water into the spin tub 19a for use in the rinse cycle. The circuit considerations herein are the same as those described above, the cold water valve 24 being opened in position #34 of the operating shaft 51 and being closed in position #38 thereof, in this case.

Now assume that when this second modified program is carried out after presetting thereof, the pressure in the water supply system is somewhat below about 10 pounds/sq. in. gauge, so that the pressure regulator 26 operates in order to produce a pressure in the delivery tube 25 that is somewhat below about 3½ pounds/sq. in. gauge; with the result that the pressure switch SP1 is open and the pressure switch PS2 is closed, at this time.

In this case, in position #5 of the operating shaft 51, the closure of the switch springs F1, PF2 is without effect, since the open pressure switch PS1 disconnects the conductor 175 from the conductor 188. However, in position #6 of the operating shaft 51, the closure by the control cam C7 of the switch springs F2, NF completes the forward start and run circuits for the respective windings 41 and 42 of the drive motor 40. The start circuit mentioned includes the elements L1, 60, 176, MP, W, 181, 45, 49, 182, J1, S2, 183, 41, 184, S4, K2, 175, PS2 closed, 189, 139, 187, NF, F2 and 173. Accordingly, operation of the drive motor 40 is initiated to cause the speed responsive device 46 to open the switch springs 43, 48 in order to interrupt the previously traced circuit for energizing the hot solenoid 23a, so as to bring about closure of the hot water valve 23, at this time.

Hence, the hot water valve 23 was opened in position #1 of the operating shaft 51 and closed in position #6 thereof; whereby the hot water valve 23 remained open during a corresponding time interval of 3¾ minutes, so as to produce a corresponding approximately 80% fill of the spin tub 19a with hot water for use in the washing cycle thus initiated.

Subsequently, the cold water valve 24 is likewise retained open for a time interval of 3¾ minutes to effect an approximate 80% fill of cold water into the spin tub 19a for use in the rinse cycle. The circuit considerations herein are the same as those described above, the cold water valve 24 being opened in position #34 of the operating shaft 51 and being closed in position #39 thereof, in this case.

Now assume that when this second modified program is carried out after presetting thereof, the pressure in the water supply system is somewhat below about 5 pounds/sq. in. gauge, so that the pressure regulator 26 operates in order to produce a pressure in the delivery tube 25 that is somewhat below about 2½ pounds/sq. in. gauge, with the result that both of the pressure switches PS1 and PS2 are opened at this time.

In this case, in position #5 of the operating shaft 51, the closure of the switch springs F1, PF2 is without effect, since the open pressure switch PS1 disconnects the conductor 175 from the conductor 188. Likewise, in position #6 of the operating shaft 51, the closure of the switch springs F2, NF is without effect, since the open pressure switch PS2 disconnects the conductor 175 from the conductor 189. However, in position #7 of the operating shaft 51 the control cam C7 closes the switch springs F2, 6F, whereby there are completed the forward start and run circuits for respectively energizing the start and run windings 41 and 42 of the drive motor 40. The start circuit mentioned includes the elements L1, 60, 176, MP, W, 181, 45, 49, 182, J1, S2, 183, 41, 184, S4, K2, 175, 138, 192, 6F, F2 and 173. Accordingly, operation of the drive motor 40 is initiated to cause the speed responsive device 46 to open the switch springs 43, 48 in order to interrupt the previously traced circuit for energizing the hot solenoid 23a so as to bring about closure of the hot water valve 23, at this time.

Hence, the hot water valve 23 was opened in position #1 of the operating shaft 51 and closed in position #7 thereof; whereby the hot water valve 23 remained open during a corresponding time interval of 4½ minutes, so as to produce a corresponding approximately 80% fill of the spin tub 19a with hot water for use in the washing cycle time initiated.

Subsequently, the cold water valve 24 is likewise retained open for a time interval of 4½ minutes to effect an approximate 80% fill of cold water into the spin tub 19a for use in the rinse cycle. The circuit considerations herein are the same as those described above, the cold water valve 24 being opened in position #34 of the operating shaft 51 and being closed in position #40 thereof, in this case.

Considering now the presetting of a third modified program, modified with respect to the basic program in the particular that an extra fill (about 140% of the normal fill) is desired in the spin tub 19a. The presetting of this third modified program is fundamentally the same as that previously described in conjunction with presetting of the basic program, except that in this case, the extra fill pushbutton 134, instead of the normal fill pushbutton 133, is depressed in the water level control switch 130 prior to the manual operation of the control dial 52 into its "axial start" position, in the manner previously explained. In this case, the depression of the extra fill pushbutton 134 in the wash level control switch 130 brings about the projection of the normal fill pushbutton 133 and the consequent opening of the contacts 132' and 133'. Also, the depression of the extra fill pushbutton 134 brings about the opening of all of the contacts 135, 136, 137, 138, 139, 131', 132', and 133', whereby none of the conductors 192, 187, 186 and 185 is connected to the conductors 175, 188 and 189.

Thus in this case, the hot water valve 23 is opened in position #1 of the operating shaft 51 and is subsequently closed in position #8 of the operating shaft 51 and entirely independent of the pressure of the water in the hot water pipe 21. Specifically when the operating shaft 51 is rotated into position #8, the control cam C9 closes the switch springs F3, 7F, with the result that the previously traced forward start and run circuits are completed for the respective windings 41 and 42 of the drive motor 40. Accordingly, the hot water valve 23 remains in its open position during a corresponding time interval of 5¼ minutes so as to produce a corresponding extra fill of approximately 140% of the spin tub 19a with hot water for use in the washing cycle thus initiated.

Subsequently, the cold water valve 24 is likewise retained open for a time interval of 5¼ minutes to effect a extra fill of approximately 140% of the spin tub 19a with cold water for use in the rinse cycle. The circuit considerations herein are the same as those described above, the cold water valve 24 being opened in position #34 of the operating shaft 51 and being closed in position #41 thereof, in this case.

By way of recapitulation, the composite operation of the water level control switch 130 and the pressure switches PS1 and PS2 to preselect the fill time intervals for the spin tub 19a for use in the wash and rinse cycles in the automatic program of the machine 10 are as follows:

(1) When the normal fill pushbutton 133 in the water level control switch is operated, each of the fill time intervals: is equal to 5T, if the pressure in the water supply system is above about 15 pounds/sq. in. gauge; is equal to 6T, if the pressure in the water supply system is below about 10 pounds/sq. in. gauge and above about 5 pounds/sq. in. gauge; and is equal to 7T, if the pressure in the water supply system is below about 5 pounds/sq. in. gauge. In each case $T=¾$ minute, and the fill of water in the spin tub 19a is approximately normal or 100% of the volume thereof.

(2) When the 80% fill pushbutton 132 in the water level control switch 130 is operated, each of the fill time intervals: is equal to 4T, if the pressure in the water supply system is above about 15 pounds/sq. in gauge; is equal to 5T, if the pressure in the water supply system is below about 10 pounds/sq. in. gauge and above about 5 pounds/sq. in. gauge; and is equal to 6T, if the pressure in the water supply system is below about 5 pounds/sq. in. gauge. In each case $T=\frac{3}{4}$ minute, and the fill of water in the spin tub 19a is approximately 80% of normal or of the volume thereof.

(3) When the 60% fill pushbutton 131 in the water level control switch 130 is operated, each of the fill time intervals: is equal to 3T, if the pressure in the water supply system is above about 15 pounds/sq. in gauge; is equal to 4T, if the pressure in the water supply system is below about 10 pounds/sq. in. gauge and above about 5 pounds/sq. in. gauge; and is equal to 5T, if the pressure in the water supply system is below about 5 pounds/sq. in. gauge. In each case $T=\frac{3}{4}$ minute, and the fill of water in the spin tub 19a is approximately 60% of normal or of the volume thereof.

(4) When the extra fill pushbutton 134 in the water level control switch 130 is operated, each of the fill time intervals is equal to 7T, independently of the pressure in the water supply system. In each case $T=\frac{3}{4}$ minute, and the volume of the fill of water in the spin tub 19a is dependent upon the pressure in the water supply system. With a pressure of at least about 15 pounds/sq. in. gauge in the water supply system, the extra fill of water in the spin tube 19a is approximately 140% of normal or of the volume thereof; whereby the water overflows the spin tub 19a incident to each filling thereof, in an obvious manner.

A fourth modified program may be effected after presetting the basic program and following operation of the manual dial 52 into its "axial start" position, in the manner previously explained, merely by the momentary operation of the select water level control switch 140, whereby the operator may, in fact, achieve a fill of hot water in the spin tub 19a preceding the wash cycle that is of substantially smaller volume than that obtained when the normal fill pushbutton 133 of the water level control switch 130 is depressed. In fact, this fill may be substantially smaller than that obtained when the 60% fill pushbutton 131 of the water level control switch 130 is depressed, since this small fill is under the direct manual control of the operator.

More particularly, when the line switch 60 is closed with the operating shaft 51 in position #1, the previously traced circuit for energizing the hot solenoid 23a is completed so as to effect opening of the hot water valve 23 and the consequent initiation of the filling of hot water into the spin tub 19a preceding the wash cycle. At any time thereafter, and particularly prior to rotation of the operating shaft 51 into position #6, the operator may determine by inspection that enough hot water is contained in the spin tub 19a for the present clothes washing operation, whereby the select water level control switch 140 is momentarily depressed, as previously noted. Depression of the pushbutton 141 of the control switch 140 momentarily closes the contact bridging member 143 thereof, whereby the conductor 175 is momentarily connected to the conductor 174. This connection of the conductor 175 to the conductor 173 effects the completion of the previously traced forward start and run circuits for energizing the windings 41 and 42 of the operating motor 40, whereby forward running thereof is initiated in the manner previously explained. Of course, operation of the drive motor 40 effects closure of the hot water valve 23 in the manner previously explained. Thus, in the present case, the hot water valve 23 remains open only during the time interval preceding operation of the pushbutton 141 of the select water level switch 140 and following operation of the dial 52 into its "axial start" position; whereby the volume of water introduced into the spin tub 19a for use in the wash cycle is entirely under the manual control of the operator.

Consider now the presetting of a fifth modified program, modified with respect to the basic program in the particular that the desired time interval of oscillation of the agitator 20a in the wash cycle is about 9 minutes, instead of about 15 minutes. The presetting of this fifth modified program is fundamentally the same as that previously described in conjunction with the presetting of the basic program, except that in this case, the operator rotates the manual dial 52 out of the beginning of the "heavy wash" position and into the beginning of the "regular wash" position and then moves the same outwardly with respect to the front wall of the backsplash 27 into its "axial start" position. At this time, the operating shaft 51 occupies position #9 when operation of the timer motor 55 is initiated; whereby the hot water valve 23 is opened for a fill time interval of about 3¾ minutes, in the manner previously explained, so that the operating shaft 51 is rotated into position #14 in order to initiate rotation of the rotor 44 of the drive motor 40 in the forward direction, thereby to effect closing of the hot water valve 23 and initiation of oscillation of the agitator 20a. The wash cycle thus initiated in position #14 of the operating shaft 51 proceeds for a time interval of about 9 minutes; whereupon the operating shaft 51 is rotated into position #26 so as to terminate the wash cycle. The remainder of this first modified program is identical to that previously described in conjunction with the basic program and is not repeated in the interest of brevity.

Consider now the presetting of a sixth modified program, modified with respect to the basic program in the particular that the desired time interval of oscillation of the agitator 20a in the wash cycle is about 3 minutes, instead of about 15 minutes. The presetting of this sixth modified program is fundamentally the same as that previously described in conjunction with the presetting of the basic program, except that in this case, the operator rotates the manual dial 52 out of the beginning of the "heavy wash" position and into the beginning of the "light wash" position and then moves the same outwardly with respect to the front wall of the backsplash 27 into its "axial start" position. At this time, the operating shaft 51 occupies position #17 when operation of the time motor 55 is initiated; whereby the hot water valve 23 is opened for a full time interval of about 3¾ minutes, in the manner previously explained, so that the operating shaft 51 is rotated into position #22 in order to initiate the rotation of the rotor 44 of the drive motor 40 in the forward direction, thereby to effect closing of the hot water valve 23 and initiation of oscillation of the agitator 20a. The wash cycle thus initiated in position #22 of the operating shaft 51 proceeds for a time interval of about 3 minutes, whereupon the operating shaft 51 is rotated into position #26 so as to terminate the wash cycle. The remainder of this second modified program is identical to that previously described in conjunction with the basic program and is not repeated in the interest of brevity.

Consider now the presetting of a seventh modified program, modified with respect to the basic program in the particular that cold water, instead of hot water, is desired in the wash cycle. The presetting of this seventh modified program is fundamentally the same as that previously described in conjunction with the presetting of the basic program, except that in this case, the cold pushbutton 113, instead of the hot pushbutton 111, is depressed in the wash water temperature control switch 110, prior to manual operation of the control dial 52 into its "axial start" position, in the manner previously explained. In this case, closure of the line switch 60 completes a circuit for energizing the cold solenoid 24a when the operating shaft 51 is in position #1; which circuit includes the elements L1, 60, 176, 24a, 177', C, CF, 180, 117, 174, 48, 43 and 173. Energization of the cold solenoid 24a effects opening of the cold water valve 24, whereby cold water is introduced from the cold water pipe 22, via the tube 25 into the spin tub 19a. Subsequentially in position #6 of the operating shaft 51, rotation of the rotor 44 of the drive motor 40 is initiated, so as to interrupt the above traced circuit for energizing the cold water solenoid 24a so as to effect closure of the cold water valve 24 and initiation of oscillation of the agitator 20a, all in the manner previously explained. The remainder of this seventh modified program is identical to that previously described in conjunction with the basic program and is not repeated in the interest of brevity.

Consider now the presetting of an eighth modified program, modified with respect to the basic program in the particular that warm water, instead of hot water, is desired in the wash cycle. The presetting of this eighth modified program is fundamentally the same as that previously described in conjunction with the presetting of the basic program, except that in this case, the warm pushbutton 112, instead of the hot pushbutton 111, is depressed in the wash water temperature control switch 110 prior to the manual operation of the control dial 52 into its "axial start" position, in the manner previously explained. In this case, the depression of the warm pushbutton 112 in the wash water temperature control switch 110 connects the conductor 178 to the conductor 174 at the contacts 115 and connects the conductor 180 to the conductor 174 at the contacts 116, whereby closure of the line switch 60 completes both the previously traced circuit for energizing the hot solenoid 23a and the previously traced circuit for energizing the cold solenoid 24a, so that both the hot water valve 23 and the cold water valve are opened, with the result that the mixture of the hot water and the cold water is productive of warn water that is projected via the tube 25 into the spin tub 19a during the fill time interval preceding the oscillation of the agitator 20a in the wash cycle. Subsequently in position #6 of the operating shaft 51, rotation of the rotor 44 of the drive motor 40 is initiated so as to interrupt, at the switch springs 43, 48 of the centrifugal device 46, a common point in the circuit for respectively energizing the hot solenoid 23a and the cold solenoid 24a so as to reclose both the hot water valve 23 and the cold water valve 24 in the manner previously explained. The remainder of this eighth modified program is identical to that previously described in conjunction with the basic program and is not repeated in the interest of brevity.

Consider now the presetting of a ninth modified program, modified with respect to the basic program in the particular that warm water, instead of cold water, is desired in the rinse cycle. The presetting of this ninth modified program is fundamentally the same as that previously described in conjunction with the presetting of the basic program, except that in this case, the warm pushbutton 122, instead of the cold pushbutton 121, is depressed in the rinse water temperature control switch 120 prior to the manual operation of the control dial 52 into its "axial start" position, in the manner previously explained. In this case, the depression of the warm pushbutton 122 in the rinse water temperature control switch 121 connects the conductor 179 to the conductor 174 at the contacts 123; whereby subsequently in the program when the central shaft 51 is rotated into position #34, the control cam C2 actuates the swtich spring C to close the switch spring CF in order to complete the previously traced circuit for energizing the cold solenoid 24a and a branching circuit for energizing the hot solenoid 23a.

This circuit for energizing the hot solenoid 23a includes the elements L1, 60, 176, 23a, 177, H, HF, 179, 123, 174, 48, 43 and 173. Accordingly, both the cold water valve 24 and the hot water valve 23 are opened, with the result that the mixture of the cold water and the hot water is productive of warm water that is projected via the tube 25 into the spin tub 19a during the fill time interval preceding the oscillation of the agitator 20a in the rinse cycle. Subsequently in position #39 of the operating shaft 51 rotation of the rotor 44 of the drive motor 40 is initiated so as to interrupt at the switch springs 43, 48 of the centrifugal device 46, a common point in the circuit for respectively energizing the cold solenoid 24a and the hot solenoid 23a so as to reclose both the cold water valve 24 and the hot water valve 23, in the manner previously explained. The remainder of this ninth modified program is identical to that previously described in conjunction with the basic program and is not repeated in the interest of brevity.

Referring now to FIG. 8, there is shown a unitary construction 200 of a water valve mechanism, a water pressure regulator, and a water-pressure responsive and switch-actuating device that may be advantageously incorporating in the machine 10 of FIG. 1 and that provides a composite construction of the corresponding individual elements as illustrated in FIGS. 1 and 5. More particularly, this unitary construction 200 essentially comprises a casing 201 provided with a hot water inlet fixture 221, a cold water inlet fixture 222, a hot water chamber 202 communicating with the hot water inlet fixture 221, a cold water chamber 203 communicating with the cold water inlet fixture 222, and a mixing chamber 204 commonly associated with the chambers 202 and 203. One section of the casing 201 is disposed as a common wall 205 between the chambers 202 and 204; and another section of the casing 201 is disposed as a common wall 206 between the chambers 203 and 204. A valve port and seat 205a is formed in the wall 205 and communicating between the chambers 202 and 204; and likewise, a valve port and seat 206a is formed in the wall 206 and communicating between the chambers 203 and 204. Also, the casing 201 comprises two wall sections 207 and 208 respectively disposed in facing relation with the walls 205 and 206. The wall 207 has an opening 207a formed therein and positioned in alignment with the valve seat 205a and removably carrying a plug 209 secured in place by a plurality of bolts 210. Similarly, the wall 208 has an opening 208a formed therein and positioned in alignment with the valve seat 206a and removably carrying a plug 211 secured in place by a plurality of bolts 212. A valve stem 213 is slidably mounted in a hole provided in the central portion of the plug 209; which valve stem 213 carries a valve element 223 on the inner end thereof and disposed in the chamber 202 in cooperating relation with the valve seat 205a. Similarly, a valve stem 215 is slidably mounted in a hole provided in the central portion of the plug 211; which valve stem 215 carries a valve element 224 on the inner end thereof and disposed in the chamber 203 in cooperating relation with the valve seat 206a. The valve element 223 is biased into closed position with respect to the valve seat 205a by a coil spring 217 surrounding the inner end of the valve stem 213 and located in the chamber 202; and similarly, the valve element 224 is biased into a closed position with respect to the valve seat 206a by a coil spring 218 surrounding the inner end of the valve stem 215 and located in the chamber 203.

The outer end of the valve stem 213 carries a magnetic armature 231 disposed exteriorly of the casing 201 and cooperating with a solenoid 223a; whereby energization of the solenoid 223a causes the armature 231 to operate the valve element 223 against the bias of the spring 217 into its open position with respect to the valve seat 205a; and whereby the valve element 223 is returned into its closed position by the spring 217 upon deenergization of the solenoid 223a. Similarly, the outer end of the valve stem 215 carries a magnetic armature 232 disposed exteriorly of the casing 201 and cooperating with a solenoid 224a; whereby energization of the solenoid 224a causes the armature 232 to operate the valve element 224 against the bias of the spring 218 into its open position with respect to the valve seat 206a; and whereby the valve element 224 is returned into its closed position by the spring 218 upon deenergization of the solenoid 224a.

Further, the casing 201 comprises a water outlet fixture 233 communicating with the mixing chamber 204 and terminating in an annular flange 234. Also, the construction 200 comprises a delivery tube or conduit 225 the outer end of which communicates with the open top of the spin tub 19a, as shown in FIG. 1 and as previously described. The inner end of the conduit 225 terminates in an annular flange 235 that is detachably secured to the annular flange 234 by a plurality of bolts 236 provided with cooperating nuts 237. A flexible diaphragm 226 is arranged between the cooperating flanges 234 and 235 and secured in place between these flanges by a surrounding sealing ring 238 also disposed between the flanges 234 and 235 and secured in place by the bolts 236; which diaphragm 226 may be formed of synthetic rubber, or other suitably flexible material, and has a substantially cylindrical hole 226a formed through the central portion thereof and providing a passage between the outer end of the outlet fixture 233 and the inner end of the conduit 225. When the valve element 223 is open, hot water passes from the hot water chamber 202 through the valve port 205a into the mixing chamber 204; and when the valve element 224 is open, cold water passes from the cold water chamber 203 into the mixing chamber 204. Either one or both of the valve elements 223 and 224 may be operated into open positions, thereby to cause hot or cold or mixed hot and cold (warm) water to be present in the mixing chamber 204 under gauge pressure and to flow therefrom through the hole 226a in the diaphragm 226 into the conduit 225 and thence from the conduit or delivery tube 225 into the open top of the spin tub 19a.

The diaphragm 226 constitutes a pressure regulator of known type, whereby it is characterized by response to a relatively high pressure of the water in the mixing chamber, a pressure of about 15 pounds/sq. in. gauge and above to produce a pressure of about 5 pounds/sq. in. gauge in the conduit 225; which pressure in the conduit 225 is substantially constant over the pressure range of about 15 to 100 pounds/sq. in. gauge in the mixing chamber 204; and with the result that a substantial constant rate of water flow of about 3 gallons/minute takes place from the conduit 225 into the spin tub 19a. However, these operating conditions are not maintained, in the event the pressure of the water in the mixing chamber 204 falls below about 15 pounds/sq. in. gauge. Specifically, when the water pressure in the mixing chamber 204 falls to about 10 pounds/sq. in. gauge, the pressure regulator 226 produces a pressure in the conduit 225 of about 3½ pounds/sq. in gauge; and when the water pressure in the mixing chamber 204 falls to about 5 pounds/sq. in. gauge, the pressure regulator 226 produces a pressure in the conduit 225 of about 2½ pounds/sq. in. gauge. Thus, when the pressure of the water in the mixing chamber 204 is at least about 15 pounds/sq. in. gauge, the volume of flow of water through the conduit 225 is proportional only to the time interval of opening of one or both of the valve elements 223 and 224 and independent of the pressure of the water in the mixing chamber 204. On the other hand, when the pressure of the water in the mixing chamber 204 is below about 15 pounds/sq. in. gauge, the volume of flow of water through the conduit 225 is proportional both to the time interval of opening of one or both of the valve elements 223 and 224 and to the pressure of the water in the mixing chamber 204.

Further, the construction 200 comprises a casing 240 including lower and upper sections 241 and 242 respectively terminating in annular flanges 243 and 244 detachably secured together by a plurality of screws 245 and with a substantially annular flexible diaphragm 246 arranged between the flanges 243 and 244. The lower casing section 241 is supported upon the top of the conduit 225 by an upstanding tube 247 arranged therebetween. The diaphragm 246 divides the interior of the casing 240 into lower and upper chambers 251 and 252; the lower chamber 251 communicates with the upper open end of the tube 247; the upper chamber 252 communicates with the atmosphere via a hole 242a provided in the upper casing section 242; and the lower open end of the tube 247 communicates with the interior of the conduit 225. As illustrated, the lower end of the tube 247 is externally threaded and is received in an internally threaded opening provided in a boss 225a carried by the conduit 225; and similarly, the upper end of the tube 247 is externally threaded and is received in an internally threaded opening provided in a boss 241a carried by the lower casing section 241. Thus, the water under gauge pressure in the conduit 225 passes through the tube 247 into the lower chamber 251, so as to cause upward deflection of the diaphragm 246. The diaphragm 246 comprises a peripheral section 246a clamped between the flanges 244 and 245, a central disk-like section 246b, and an annular section 246c interconnecting the sections 246a and 246b. A micro-switch PS1 is arranged in the upper chamber 252 and carried by a bracket 253 secured to the upper casing section 242 by a screw 254; and a micro-switch PS2 is arranged in the upper chamber 252 and secured to the upper casing section 242. The switch PS1 includes an actuating button PS1a operatively associated with the diaphragm section 246b; and the switch PS2 includes an actuating button PS2a operatively associated with the diaphragm section 246c. The switch PS1 terminates the common conductor 175 and the individual conductor 188; the switch PS2 terminates the common conductor 175 and the individual conductor 189; and the three conductors 175, 188 and 189 extend to the exterior of the upper chamber 252 through a grommet 264 arranged in a hole provided in the top of the upper casing section 242.

When the pressure of the water in the conduit 225 is in the general range from about 3½ to 5 pounds/sq. in. gauge this relatively high pressure is transmitted through the tube 247 into the lower chamber 251 to actuate the diaphragm 246; whereby the sections 246b and 246c thereof both move upwardly and respectively engage the buttons PS1a and PS2a, so as to close both of the switches PS1 and PS2. When the pressure of the water in the conduit 225 is in the general range from somewhat below 3½ pounds/sq. in. gauge to about 2½ pounds/sq. in. gauge, this relatively medium pressure is transmitted through the tube 247 into the lower chamber 251 to actuate the diaphragm 246; whereby the section 246c thereof moves upwardly and engages the button PS2a, so as to close the switch PS2; however, the section 246b thereof does not move upwardly sufficiently to engage the button PS1a, so that the switch PS1 remains open. When the pressure of the water in the conduit 225 is below about 2½ pounds/sq. in. gauge, this relatively low pressure is transmitted through the tube 247 into the lower chamber 251 to actuate the diaphragm 246; whereby the sections 246c and 246b do not move upwardly sufficiently to engage the respective buttons PS2a and PS1a, so that both of the switches PS2 and PS1 remain open.

FIG. 8A somewhat schematically shows a modified form of flow responsive switching mechanism for the water inlet control arrangement. Rather than response to positive pressure, as dictated by the water line pressure upstream of the flow control device, the FIG. 8A embodiment operates on negative pressure. In each embodiment, however, the action of the respective switches results from greater flow of water to the washing machine.

In FIG. 8A the conduit 333 represents the outlet from the solenoid-actuated valves (not shown); 326 is the flow control device. The downstream conduit 325 is formed with a Venturi throat 325.1 with which the attachment fitting 325a communicates. As is well known, fluid flow through the Venturi throat produces a negative pressure at the throat.

The switch actuating mechanism 340 comprises the housing parts 341 and 342. The imperforate diaphragm 346 divides the housing into a lower chamber 351 which is sealed against external atmosphere, and an upper chamber 352 which is in communication with the external atmosphere through any appropriate venting arrangement. A spiral spring 351.1 bottomed against the housing part 341 urges the diaphragm 346 to a normally stable position. A conduit 347, which may be a flexible tube, communicates between the chamber 351 and the Venturi throat 325.1, whereupon according to the extent of negative pressure the diaphragm 346 will be urged downwardly by reason of the atmospheric pressure in the chamber 352. A piston rod 390 is appropriately attached to the diaphragm 346 to be actuated thereby; the rod 390 may be guided in a bearing sleeve 391.

A micro-switch PS20 corresponds in circuit function to switch PS2 of FIG. 8, and a micro-switch PS10 corresponds in circuit function to switch PS1. It will be understood, however, that in the arrangement of FIG. 8A the switches PS20 and PS10 are normally closed and are established in open position by the respective lever arms 392 and 393, these arms being spring-biased to exert an upward pressure against the respective switch actuating buttons. It will be understood that the free ends of the switch actuators 392 and 393 are forked or otherwise apertured to accomplish the free passage of the rod 390 therethrough; and to translate rectilinear movement of the rod 390 into the necessary movement of the switch actuators, the rod 390 is provided with the pins 394 and 395, which under certain operational conditions will bear against the associated switch actuator arms to permit the switches to move to closed circuit condition.

In connection with the FIG. 8 embodiment, it will be recalled that when water pressure in the conduit 225 is in the general range from about three and one half to five pounds per square inch gauge, the diaphragm 246 is distended sufficiently to effect the closure of the switches PS1 and PS2; that in a pressure range of two and one half to below three and one half pounds per square inch gauge, the upward movement of diaphragm 246 was sufficient only to close switch PS2; and when the pressure was below two and one half pounds per square inch gauge, there was insufficient diaphragm movement to close even the switch PS2.

The above-noted conduit pressures have a general relation to water pressures in the household system of at or above fifteen pounds per square inch gauge; from ten to fifteen pounds per square inch gauge; and from six to ten pounds per square inch gauge respectively. Without relating any particular negative pressure in conduit 374 to these supply pressures, for it will be understood that the shape and other parameters of the Venturi throat establish these, it will be noted that the flow rate corresponding generally to the above-noted pressures in conduit 225 actuate the respective switches to their closed circuit in similarity to the operation of the device 240. For example, when the house pressure is at fifteen pounds per square inch gauge, or above, the negative pressure within the chamber 351 is such that each of the respective pins 394 and 395 will actuate the associated switch lever to cause each of the switches PS20 and PS10 to close; when the house pressure is in the ten to fifteen pound per square inch gauge range, the diaphragm movement will be sufficient only for the pin 395 to actuate lever 392 to permit switch PS20 to close; and when the pressure is in the six to ten pound per square inch gauge range, there will be insufficient movement of diaphragm 346 for pin 395 to engage lever 392, whereupon both of the switches PS10 and PS20 remain open.

In view of the foregoing it is apparent that there has been provided in an automatic clothes washing machine, a control circuit therefor that incorporates manually operable facility for selectively presetting the desired fill of water into the tub of the machine, pressure controlled facility that is selectively operated in accordance with the pressure of the water in the associated water supply system for the machine, apparatus controlled jointly by the preset position of the manually operable facility and by the operated position of the pressure controlled facility for preselecting a fill time interval, and a timer-operated program controller for selectively operating the machine in an automatic program, and including the preselected fill time interval during which the water supply system is opened into the tub of the machine for use in the wash and rinse cycles in the automatic program of the machine, whereby the position of the pressure controlled facility compensates the preset position of the manually operable facility for variations in the pressure of the water in the water supply system.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In an automatic clothes washing machine including a tub adapted to receive clothes to be washed, a water supply system containing water under gauge pressure, valve mechanism operative to introduce water from said water supply system into said tub, agitation mechanism operative to agitate the clothes in the water in said tub, expulsion mechanism operative to expel the water from said tub and from the clothes therein, and a program controller operative through a timed cycle selectively to operate said three mechanisms named in order to produce a clothes processing program in said machine and including a preselected fill time interval and an agitation time interval and an expulsion time interval, wherein the volume of water that is introduced from said water supply system into said tub for use in said clothes processing program is determined jointly by the pressure of the water in said water supply system and by said preselected fill time interval; the combination comprising a manually operable fill controller selectively presettable into a number of control positions, a device controlled by the pressure of the water in said water supply system and selectively operated thereby into a number of control positions, and apparatus controlled jointly by the preset position of said fill controller and by the operated position of said device for preselecting said fill time interval, whereby the operated positions of said device compensate the preset positions of said fill controller for variations in the pressure of the water in said water supply system.

2. The automatic clothes washing machine combination set forth in claim 1, wherein said apparatus preselects the fill time intervals T1 and T2 when said fill controller is preset into a given position and said device is respectively operated into a relatively high pressure position and into a relatively low pressure position, and wherein $T1 < T2$.

3. The automatic clothes washing machine combination set forth in claim 1, wherein said apparatus preselects the fill time intervals T1 and T2 and T3 when said fill controller is preset into a given position and said device is respectively operated into a relatively high pressure position and into a relatively medium pressure position and into a relatively low pressure position, and wherein $T1 < T2 < T3$.

4. The automatic clothes washing machine combination set forth in claim 1, wherein said apparatus preselects the fill time intervals T1 and T2 when said fill controller is preset into a first position and said device is respectively operated into a relatively high pressure position and into a relatively low pressure position, wherein said apparatus preselects the fill time intervals T2 and T3 when said fill controller is preset into a second position and said device is respectively operated into said relatively high pressure position and into said relatively low pressure position, and wherein $T1 < T2 < T3$.

5. The automatic clothes washing machine combination set forth in claim 1, wherein said apparatus preselects the fill time intervals T1 and T2 and T3 when said fill controller is preset into a first position and said device is respectively operated into a relatively high pressure position and into a relatively medium pressure position and into a relatively low pressure position, wherein said apparatus preselects the fill time intervals T2 and T3 and T4 when said fill controller is preset into a second position and said device is respectively operated into said relatively high pressure position and into said relatively medium pressure position and into said relatively low pressure position, and wherein $T1<T2<T3<T4$.

6. The automatic clothes washing machine combination set forth in claim 1, wherein said apparatus preselects the fill time intervals T1 and T2 when said fill controller is preset into a first position and said device is respectively operated into a relatively high pressure position and into a relatively low pressure position, wherein said apparatus preselects the fill time intervals T2 and T3 when said fill controller is preset into a second position and said device is respectively operated into said relatively high pressure position and into said relatively low pressure position, wherein said apparatus preselects the fill time intervals T3 and T4 when said fill controller is preset into a third position and said device is respectively operated into said relatively high pressure position and into said relatively low pressure position, and wherein $T1<T2<T3<T4$.

7. In an automatic clothes washing machine including a tub adapted to receive clothes to be washed, a water supply system containing water under gauge pressure, valve mechanism operative to introduce water from said water supply system into said tub, agitation mechanism operative to agitate the clothes in the water in said tub, expulsion mechanism operative to expel the water from said tub and from the clothes therein, and a program controller operative through a timed cycle selectively to operate said three mechanisms named in order to produce a clothes processing program in said machine and including a preselected fill time interval and an agitation time interval and an expulsion time interval, wherein the volume of water that is introduced from said water supply system into said tub for use in said clothes processing program is determined jointly by the pressure of the water in said water supply system and by said preselected fill time interval; the combination comprising a manually operable fill controller selectively presettable into a number of control positions, a device controlled by the pressure of the water in said water supply system and selectively operated thereby into a number of control positions, means controlled jointly by a first preset position of said fill controller and by a relatively high pressure position of said device for preselecting said fill time interval of a value T1, means controlled jointly by said first preset position of said fill controller and by a relatively low pressure position of said device for preselecting said fill time interval of a value T2, means controlled solely by a second preset position of said fill controller for preselecting said fill time interval of a value T3, wherein $T1<T2<T3$, whereby the operated positions of said device compensate said first preset positions of fill controller for variations in the pressure of the water in said water supply system, without so compensating said second preset position of said fill controller.

8. In an automatic clothes washing machine including a tub adapted to receive clothes to be washed, a conduit communicating with said tub, a water supply system containing water under gauge pressure, valve mechanism having a normally closed position disconnecting said water supply system from said conduit and operative into an open position connecting said water supply system to said conduit, whereby water is introduced from said water supply system via said conduit into said tub when said valve mechanism occupies its open position, a pressure regulator arranged in said conduit, said pressure regulator being characterized by response to relatively high pressure in said conduit and by non-response to relatively low pressure in said conduit, said pressure regulator responding to said relatively high pressure in said conduit to establish a substantially fixed rate of flow of the water from said conduit into said tub, with the result that the volume of the water introduced into said tub is substantially proportional only to the time interval of opening of said valve mechanism when said relatively high pressure exists in said water supply system, and with the result that the volume of the water introduced into said tub is proportional both to the time interval of opening of said valve mechanism and to the pressure of water in said water supply system when said relatively low pressure exists in said water supply system, agitation mechanism operative to agitate the clothes in the water in said tub, expulsion mechanism operative to expel the water from said tub and from the clothes therein, and a program controller operative through a timed cycle selectively to operate said three mechanisms named in order to produce a clothes processing program in said machine and including a preselected fill time interval and an agitation time interval and an expulsion time interval; the combination comprising a manually operable fill controller selectively presettable into a number of control positions, wherein said preset positions of said fill controller respectively correspond to different fill time intervals, a device controlled by the pressure of the water in said water supply system, said device being characterized by response to said relatively high pressure of the water in said supply sytsem to operate into a high position and by response to said relatively low pressure of water in said water supply system to operate into a low position, and apparatus controlled jointly by the preset position of said fill controller and by the operated position of said device for preselecting said fill time interval, wherein said apparatus is controlled by said device in its high position to preselect a fill time interval corresponding to the preset position of said fill controller, and wherein said apparatus is controlled by said device in its low position to preselect a fill time interval that is an increment of time longer than that corresponding to the preset position of said fill controller, whereby the operated positions of said device compensate the preset positions of said fill controller for variations in the pressure of the water in said water supply system.

9. The automatic clothes washing machine set forth in claim 8, wherein said relatively high pressure is about 15 pounds per square inch gauge and above, and said fixed rate of flow of water is about 6 gallons per minute.

10. The automatic clothes washing machine combination set forth in claim 1, wherein said preset positions of said fill controller respectively correspond to the time intervals 3T, 4T and 5T, and said increment of time is equal to 1T, wherein T is equal to about 45 seconds.

11. The automatic clothes washing machine combination set forth in claim 1, wherein said preset positions of said fill controller respectively correspond to the time intervals 3T, 4T and 5T, and said increment of time is equal to 2T, wherein T is equal to about 45 seconds.

12. In an automatic clothes washing machine including a tub adapted to receive clothes to be washed, a conduit communicating with said tub, a water supply system containing water under gauge pressure, valve mechanism having a normally closed position disconnecting said water supply system from said conduit and operative into an open position connecting said water supply system to said conduit, whereby water is introduced from said water supply system via said conduit into said tub when said valve mechanism occupies its open position, a pressure regulator arranged in said conduit, said pressure regulator being characterized by response to relatively high pressure in said conduit and by non-response to relatively medium pressure and to relatively low pressure in said conduit, said pressure regulator responding to said relatively high pressure in said conduit to establish a substantially fixed rate of flow of the water from said conduit into said tub, with the result that the volume of the water introduced into said tub is substantially proportional only to the time interval of opening of said valve mechanism when said relatively high pressure exists in said conduit, and with the result that the volume of the water introduced into said tub is proportional both to the time interval of opening of said valve mechanism and to the pressure of the water in said conduit when either said relatively medium pressure or said relatively low pressure exists in said conduit, agitation mechanism operative to agitate the clothes in the water in said tub, expulsion mechanism operative to expel the water from said tub and from the clothes therein, and a program controller operative through a timed cycle selectively to operate said three mechanisms named in order to produce a clothes processing program in said machine and including a preselected fill time interval and an agitation time interval and an expulsion time interval; the combination comprising a manually operable fill controller selectively presettable into a number of control positions, wherein said preset positions of said fill controller respectively correspond to different fill time intervals, a device controlled by the pressure of the water in said water supply system, said device being characterized by response to said relatively high pressure of the water in said water supply system to operate into a high position and by response to said relatively medium pressure of the water in said water supply system to operate into a medium position and by response to said relatively low pressure of the water in said water supply system to operate into a low position, and apparatus controlled jointly by the preset position of said fill controller and by the operated position of said device for preselecting said fill time interval, wherein said apparatus is controlled by said device in its high position to preselect a fill time interval corresponding to the preset position of said fill controller, wherein said apparatus is controlled by said device in its medium position to preselect a fill time interval that is one increment of time longer than that corresponding to the preset position of said fill controller, and wherein said apparatus is controlled by said device in its low position to preselect a fill time interval that is two increments of time longer than that corresponding to the preset position of said fill controller, whereby the operated positions of said device compensate the preset positions of said fill controller for variations in the pressure of the water in said water supply system.

13. In an automatic clothes washing machine including a tub adapted to receive clothes to be washed, a conduit communicating with said tub, a hot water supply pipe containing hot water under gauge pressure, a cold water supply pipe containing cold water under gauge pressure, hot valve mechanism having a normally closed position disconnecting said hot water supply pipe from said conduit and operative into an open position connecting said hot water supply pipe to said conduit, cold valve mechanism having a normally closed position disconnecting said cold water supply pipe from said conduit and operative into an open position connecting said cold water supply pipe to said conduit, whereby water is introduced via said conduit into said tub when either one or said valve mechanisms occupies its open position or when both of said valve mechanisms occupy their open positions, a pressure regulator arranged in said conduit, said pressure regulator being characterized by response to relatively high pressure in said conduit and by non-response to relatively low pressure in said conduit, said pressure regulator responding to said relatively high pressure in said conduit to establish a substantially fixed rate of flow of the water from said conduit into said tub, with the result that the volume of the water introduced into said tub is substantially proportional only to the time interval of opening of said valve mechanism when said relatively high pressure exists in said conduit, and with the result that the volume of the water introduced into said tub is proportional both to the time interval of opening of said valve mechanism and to the pressure of the water in said conduit when said relatively low pressure exists in said conduit, agitation mechanism operative to agitate the clothes in the water in said tub, expulsion mechanism operative to expel the water from said tub and from the clothes therein, manually operable means for preselecting one or the other or both of said valve mechanisms to be operated, and a program controller operative through a timed cycle selectively to operate said preselected one or both of said valve mechanisms and to operate said second and third mechanisms in order to produce a clothes processing program in said machine and including a preselected fill time interval and an agitation time interval and an expulsion time interval; the combination comprising a manually operable fill controller selectively presettable into a number of control positions, wherein said preset positions of said fill controller respectively correspond to different fill time intervals, a device controlled by the pressure of the water in said conduit, said device being characterized by response to said relatively high pressure of the water in said conduit to operate into a high position and by response to said relatively low pressure of the water in said conduit to operate into a low position, and apparatus controlled jointly by the preset position of said fill controller and by the operated position of said device for preselecting said fill time interval, wherein said apparatus is controlled by said device in its high position to preselect a fill time interval corresponding to the preset position of said fill controller, and wherein said apparatus is controlled by said device in its low position to preselect a fill time interval that is an increment of time longer than that corresponding to the preset position of said fill controller, whereby the operated positions of said device compensate the preset positions of said fill controller for variations in the pressure of the water in said conduit.

14. In an automatic clothes washing machine including a tub adapted to receive clothes to be washed, a water supply system comprising a casing having a hot water inlet adapted to be connected to a hot water pipe containing hot water under gauge pressure and a cold water inlet adapted to be connected to a cold water pipe containing cold water under gauge pressure, said casing defining a mixing chamber and also having a water outlet communicating with said mixing chamber, a hot valve mechanism carried by said casing and selectively controlling communication between said hot water inlet and said mixing chamber, a cold valve mechanism carried by said casing and selectively controlling communication between said cold water inlet and said mixing chamber, a pressure regulator carried by said casing and arranged in said water outlet, said pressure regulator being characterized by response to relatively high pressure of the water in said mixing chamber and by non-response to relatively low pressure of the water in said mixing chamber, said pressure regulator responding to said relatively high pressure in said mixing chamber to establish a substantially fixed rate of flow of the water from said mixing chamber through said water outlet, a conduit connected to said water outlet and communicating with said tub, with the result that the volume of the water introduced into said tub via said conduit is substantially proportional only to the time interval of opening of one or both of said valve mechanisms when said relatively high pressure exists in said mixing chamber, and with the result that the volume of the water introduced into said tub via said conduit is proportional both to the time interval of opening of one or both of said valve mechanisms and to the pressure of the water in said mixing chamber when said relatively low pressure exists in said mixing chamber, a device controlled by the pressure of the water in said conduit, said device being characterized by response to said relatively high pressure of the water in said conduit to operate into a high position and by response to said relatively low pressure of the water in said conduit to operate into a low position, a manually operable fill controller selectively presettable into a number of control positions, wherein said preset positions of said fill controller respectively correspond to different fill time intervals, apparatus controlled jointly by the preset position of said fill controller by the operated position of said device for preselecting a fill time interval, wherein said apparatus is controlled by said device in its high position to preselect a fill time interval corresponding to the preset position of said fill controller, and wherein said apparatus is controlled by said device in its low position to preselect a fill time interval that is an increment of time longer than that corresponding to the preset position of said fill controller, whereby the operated positions of said device compensate the preset positions of said fill controller for variations in the pressure of the water in said mixing chamber, means for preselecting one or both of said valve mechanism, and a program controller operative through a timed cycle to operate into its open position the preselected one or both of said valve mechanisms during said preselected fill time interval.

References Cited by the Examiner

UNITED STATES PATENTS

| | | | |
|---|---|---|---|
| 2,957,329 | 10/1960 | Re | 68—12 |
| 3,087,319 | 4/1963 | Lew | 68—12 |
| 3,133,433 | 5/1964 | Gebel | 68—12 |

WALTER A. SCHEEL, *Primary Examiner.*

WILLIAM I. PRICE, *Examiner.*